(12) United States Patent
Sorenson et al.

(10) Patent No.: US 11,096,322 B2
(45) Date of Patent: Aug. 24, 2021

(54) ROLLER ASSEMBLY FOR SMOOTHING GRANULAR MEDIA

(71) Applicant: MOMENTUS GOLF, INC., Mt. Pleasant, IA (US)

(72) Inventors: James W. Sorenson, Evergreen, CO (US); Steven M. Tipton, Tulsa, OK (US)

(73) Assignee: Momentus Golf, Inc., Mt. Pleasant, IA (US)

(*) Notice: Subject to any disclaimer, the term of this patent is extended or adjusted under 35 U.S.C. 154(b) by 194 days.

(21) Appl. No.: 16/219,762

(22) Filed: Dec. 13, 2018

(65) Prior Publication Data
US 2019/0254219 A1    Aug. 22, 2019

Related U.S. Application Data

(60) Provisional application No. 62/598,297, filed on Dec. 13, 2017, provisional application No. 62/614,833, filed on Jan. 8, 2018.

(51) Int. Cl.
*A01B 29/04* (2006.01)
*A01B 29/06* (2006.01)
(Continued)

(52) U.S. Cl.
CPC ............ *A01B 29/048* (2013.01); *A01B 29/06* (2013.01); *A01B 49/027* (2013.01); *E01C 19/23* (2013.01); *A63B 57/50* (2015.10); *A63K 3/00* (2013.01)

(58) Field of Classification Search
CPC ..... A01B 29/048; A01B 29/06; A01B 49/027; E01C 19/23; E01C 19/41
See application file for complete search history.

(56) References Cited

U.S. PATENT DOCUMENTS 2,200,631 A * 5/1940 Merlich ............... A01B 49/027
                                                           172/142
2,206,612 A   7/1940 Linaberry
(Continued)

FOREIGN PATENT DOCUMENTS

GB      2317602 A     4/1998
GB      2400295 A     10/2004

OTHER PUBLICATIONS

"Bunker Wizard" Momentus Sports [online]. Published on Mar. 19, 2019 [retrieved on Apr. 29, 1-39 2019]. Retrieved from the Internet: https://www.momentussports.com/product/bunker-wizard/.
(Continued)

*Primary Examiner* — Tara Mayo-Pinnock
(74) *Attorney, Agent, or Firm* — James F. Lea, III; Gable Gotwals

(57) ABSTRACT

A roller assembly for smoothing an expanse of granular media such as golf bunker sand, snow, horse race track dirt, or other media. The assembly has one or more rollers having a longitudinal axis. Each roller includes wires spaced from the axis to define a roller surface. Each wire is resiliently flexible to distort inwardly in response to force of contact on, and to recover during release of force from, the granular media as the roller rotates about the axis on the granular media. A shaft extends along the axis of the roller assembly between the arms of a yoke with a handle extending therefrom. As the roller surface traverses the media, at least some of the media is flung outwardly of the roller, smoothing the expanse. The roller assembly may be manually operated or may be towed behind a towing apparatus.

38 Claims, 27 Drawing Sheets

(51) Int. Cl.
    *A01B 49/02*     (2006.01)
    *E01C 19/23*     (2006.01)
    *A63B 57/50*     (2015.01)
    *A63K 3/00*     (2006.01)

(56) References Cited

U.S. PATENT DOCUMENTS

| | | | | |
|---|---|---|---|---|
| 3,215,293 A | * | 11/1965 | Kelly et al. | A63B 47/021 |
| | | | | 414/440 |
| 3,220,488 A | | 11/1965 | Becker | |
| 3,227,298 A | | 1/1966 | Shoemaker | |
| 3,604,190 A | * | 9/1971 | Wray | A01D 51/002 |
| | | | | 56/328.1 |
| 3,613,802 A | * | 10/1971 | Carlson et al. | A01D 76/00 |
| | | | | 172/457 |
| 3,709,303 A | | 1/1973 | Richards | |
| 3,804,449 A | * | 4/1974 | Falitz | A63B 47/021 |
| | | | | 294/19.2 |
| 4,102,405 A | | 7/1978 | Carman | |
| 4,278,134 A | | 7/1981 | Johnson | |
| 4,284,273 A | | 8/1981 | Gansewig | |
| D323,831 S | * | 2/1992 | Hollis | A01G 20/43 |
| | | | | D15/10 |
| 5,357,739 A | | 10/1994 | Nuss | |
| 5,407,242 A | * | 4/1995 | Beranek | A63B 47/021 |
| | | | | 294/19.2 |
| 5,974,771 A | | 11/1999 | Greenan | |
| 8,801,061 B2 | * | 8/2014 | Holt | A01G 20/43 |
| | | | | 294/19.2 |
| 9,820,439 B1 | * | 11/2017 | Tung | A01D 51/002 |
| 2005/0056436 A1 | | 3/2005 | Lundh | |
| 2007/0028582 A1 | | 2/2007 | Giguere | |
| 2010/0107589 A1 | | 5/2010 | Mackay | |
| 2012/0241181 A1 | | 9/2012 | Horsch | |
| 2012/0279194 A1 | | 11/2012 | Pope | |
| 2013/0062084 A1 | * | 3/2013 | Casper et al. | A01B 49/027 |
| | | | | 172/540 |
| 2014/0262379 A1 | * | 9/2014 | Landoll et al. | A01B 33/02 |
| | | | | 172/452 |
| 2017/0079192 A1 | * | 3/2017 | Steinlage et al. | A01B 19/02 |

OTHER PUBLICATIONS

International Search Report dated Jun. 19, 2019 in PCT/US2018/065550; ISA/US.

\* cited by examiner

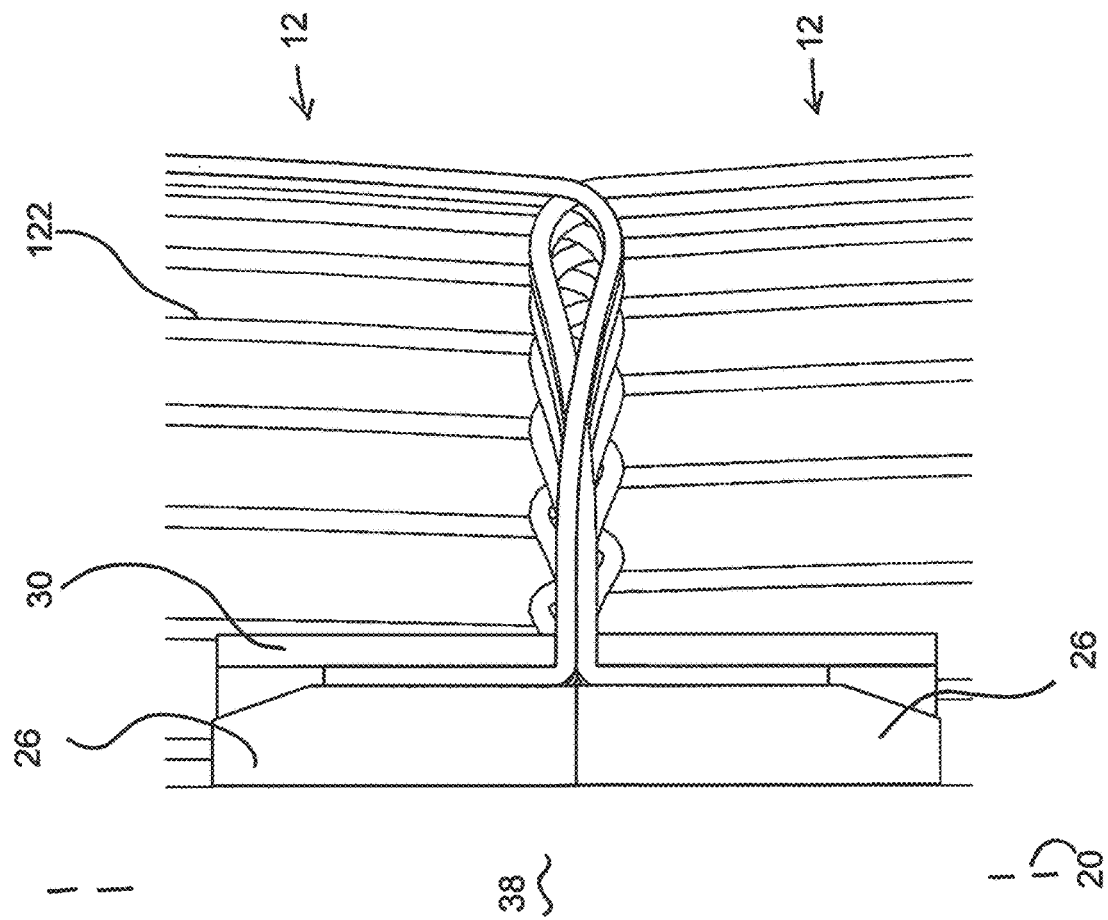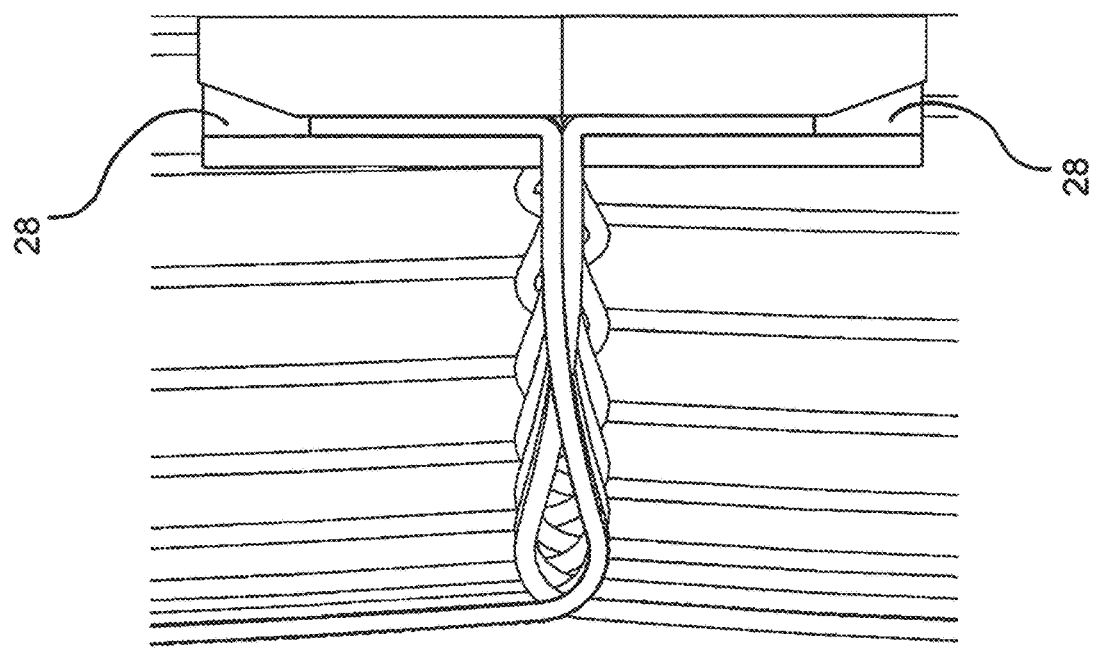
FIG. 8

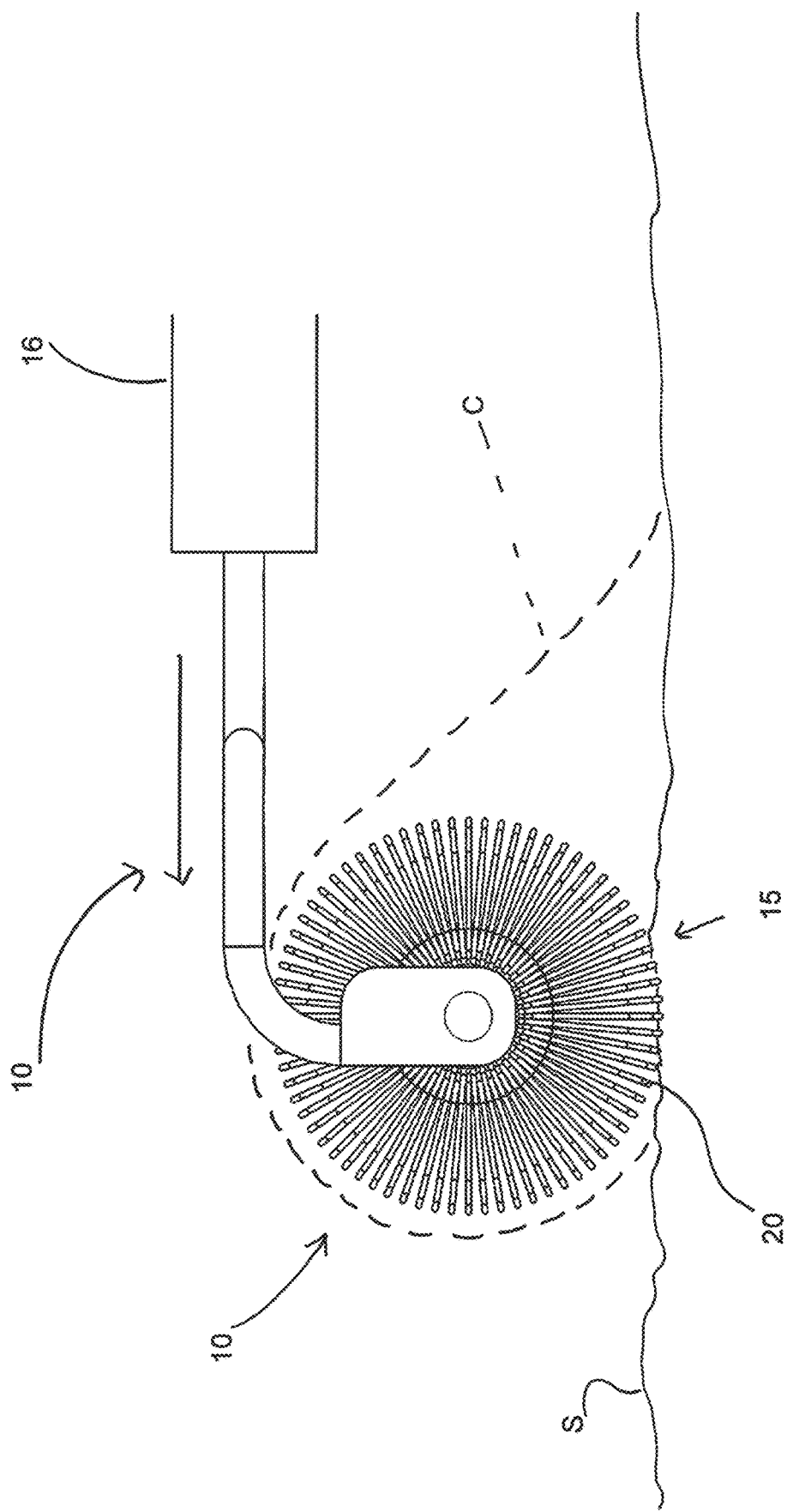

ROLLER ASSEMBLY FOR SMOOTHING GRANULAR MEDIA

CROSS REFERENCE TO RELATED APPLICATIONS

This application claims the priority of U.S. Provisional Patent Application No. 62/598,297 titled "ROLLER ASSEMBLY FOR SMOOTHING THE SAND OF A GOLF COURSE BUNKER," filed Dec. 13, 2017, and U.S. Provisional Patent Application No. 62/614,833 title, "ROLLER ASSEMBLY FOR SMOOTHING THE SAND OF A GOLF COURSE BUNKER, filed Jan. 8, 2018, the contents of both of which are hereby incorporated by reference.

FIELD OF THE INVENTION

This invention relates generally to tools for smoothing an expanse of granular media and more particularly concerns a tool for smoothing sand, e.g., in a golf bunker, snow, e.g., on a ski slope, dirt, e.g., at a horse race track, or other granular media.

BACKGROUND OF THE INVENTION

The rules of golf prohibit a golfer from altering the lie of a golf ball in a bunker, regardless of whether the condition of the lie is the result of natural phenomena, such as wind and rain, or artificial phenomena, such as the feet or club of a golfer playing an earlier shot out of the bunker. Whatever the cause, irregularities in the surface of the sand make bunker shots more difficult. Consequently, courteous players leaving a bunker use a rake conveniently located in the vicinity of the bunker by course management to smooth the sand for the oncoming players.

The sand in the bunker may be dry, loose or compacted, fine or heavy grained. Known bunker rakes are of the bar and prong variety, with rigid prongs extending downwardly at equal intervals and at equal depths from a rigid bar. The rake available may be used with the tines pointing up or down to divide the sand into ridges and furrows which will hopefully be leveled by the following horizontal bar. Depending on the varying topographies of a bunker, the instant climate conditions and the consistency of the sand, truly smooth results are rarely achieved and then only by multiple strokes of the rake. It is not uncommon that a golfer whose shot has found a bunker might be ungrateful for the extended courtesy.

It is, therefore, an object of this invention to provide a tool for smoothing sand in a golf bunker. It is also an object of this invention to provide a tool affording consistent sand smoothing results for a variety of bunker topographies, climate conditions and sand consistencies.

It is a further object of the invention to provide a tool for smoothing snow, e.g., on a ski slope. Typical equipment for grooming ski slopes include tillers that produce ridges in the snow, which provide an effect referred to as "corduroy".

It is a further object of the invention to provide a tool for smoothing dirt, e.g., at a horse race track.

It is an object of the invention to provide a tool for smoothing granular media more effortlessly than possible with traditional equipment.

SUMMARY OF THE INVENTION

In accordance with the invention, a roller assembly is provided for smoothing an expanse of granular media. An array of wires is spaced from a longitudinal axis to define a convex roller surface. Each wire is resiliently flexible to distort inwardly in response to increasing force of contact on, and to recover during release of force of contact from, the granular media as the wire array rotates about the axis and the roller surface revolves around the axis on the expanse of granular media. As the roller surface traverses the expanse, at least some of the granular media is flung outwardly of the roller of the roller assembly, thereby smoothing the expanse.

In one embodiment, each wire may be disposed in a corresponding radial plane emanating from the longitudinal axis and the corresponding radial planes. In another embodiment, each wire may extend between corresponding radii emanating from the longitudinal axis with the corresponding radii of each wire being in different planes relative to the longitudinal axis. In either the radial plane embodiment or the corresponding radii embodiment, convexities of outer portions of the convex roller surface may be more arcuate than a convexity of an inner portion of the convex roller surface.

The roller assembly may also have two bushings, one at each end of the array of wires, with opposite ends of each wire being fixed to a corresponding one of the bushings. For example, each bushing may cooperate with a corresponding ring to clamp corresponding wires in an annulus between the bushing and the ring.

In one embodiment, a shaft extends along the longitudinal axis of the roller assembly and the bushings are rotatable about the longitudinal axis of the shaft. The shaft extends between the arms of a yoke. In one embodiment, an elongated handle extends from the yoke transverse to the shaft. In a separate embodiment, bushings are mounted proximate ends of the yoke and no shaft is utilized.

Each wire may be resiliently flexible to distort inwardly in response to increasing force of contact with, and to recover during release of force of contact from, the granular media as the roller rotates about the common longitudinal axis on the expanse of granular media.

A roller assembly may have two or more rollers serially aligned on a common longitudinal axis or may have two or more rollers having offset longitudinal axes. Each roller is an array of wires spaced from the common longitudinal axis to define a convex roller surface. The roller surfaces of the rollers of the roller assembly rotate about the common axis as the roller surfaces traverse the expanse of granular media. At least some of the granular media is flung outwardly of the roller assembly by the spring-like recovery of the wires from the release of compressive force from contact with the granular media, thus smoothing the granular media. Media contacting surfaces on spring-like structures other than wires are also possible.

In one embodiment, each wire of each array may be disposed in a corresponding radial plane emanating from the common longitudinal axis and the radial planes of each array may be spaced at equal angular increments about the common longitudinal axis. In another embodiment, each wire of each array may extend between corresponding radii emanating from the longitudinal axis with the corresponding radii of each wire being in different planes relative to the longitudinal axis. The corresponding radii of each wire of each array may be spaced at equal angular increments about the longitudinal axis. In either the radial plane embodiment or the corresponding radii embodiment, convexities of outer portions of the convex roller surface of each roller may be more arcuate than a convexity of the inner portion of the convex roller surface.

Each of the rollers may further have two bushings, one at each end of each roller, opposite ends of each wire being fixed to a corresponding one of the bushings. Each bushing may cooperate with a corresponding ring to clamp corresponding wires in a corresponding annulus therebetween.

A common shaft may extend along the common longitudinal axis of the roller assembly and the bushings of each roller may be rotatable about the common longitudinal axis of the shaft. The shaft extends between the arms of the yoke and an elongated handle extends from the yoke transverse to the shaft.

The end portions of the wires of juxtaposed rollers may be overlapped in alternating-mesh sequence to cause the rollers to rotate in unison about the common longitudinal shaft and to assure the smooth expanse of granular media along the entire length of the roller assembly.

Each wire of each roller may be resiliently flexible to distort inwardly in response to increasing force of contact with, and to recover during release of force of contact from, the granular media as the roller assembly rotates about the common longitudinal axis on the expanse of granular media.

A roller assembly is provided for smoothing an expanse of granular media. The roller assembly comprises at least one roller having first end, a second end, and a longitudinal axis. A plurality of media contacting surfaces, such as an external surface of a plurality of wires, are provided that revolve around the longitudinal axis, wherein at least a portion of each of the media contacting surfaces are inwardly movable from a first position to a compressed position, wherein the compressed position is closer to the longitudinal axis than the first position, the compressed position resulting from forces due to contact with the granular media. When one of the media contacting surfaces is in the compressed position, the media contacting surface returns to the first position with sufficient force and speed to fling at least some of the granular media outwardly from the at least one roller.

The plurality of wires have a first end proximate the first end of the roller and a second end proximate the second end of the roller. A first bushing is proximate the first end of the plurality of wires and a second bushing is proximate to the second end of the plurality of wires. Each of the bushings cooperate with a corresponding ring to clamp the plurality of wires in an annulus therebetween. In one embodiment, a shaft extends along the longitudinal axis. The bushings are rotatable about the longitudinal axis.

The roller assembly may have a yoke wherein a shaft extends between arms of the yoke.

Optionally, no shaft may be provided. An elongated handle extends from the yoke in a direction transverse to the longitudinal axis or shaft.

Each wire of the plurality of wires may be disposed in a corresponding radial plane emanating from the longitudinal axis. The corresponding radial planes of the plurality of wires may be spaced at equal angular increments about the longitudinal axis. Each wire of the plurality of wires may have a first radial segment affixed to a first bushing, a second radial segment affixed to a second bushing, and a longitudinal portion between the first radial segment and the second radial segment, wherein the first radial segment is disposed in a first radial plane emanating from the longitudinal axis and the second radial segment is disposed in a second radial plane emanating from the longitudinal axis. The first radial segment and the second radial segment of the wire of the plurality of wires may be spaced at equal angular increments about the longitudinal axis.

Each wire of the plurality of wires are resiliently flexible to distort inwardly in response to increasing force of contact with, and to recover during release of force of contact from, the granular media as the roller rotates about the longitudinal axis on the expanse of granular media.

In one embodiment, a plurality of plowing members are provided to the roller. The plowing members are provided for breaking up the granular media and the roller is provided for smoothing the broken up granular media.

In one embodiment, the plurality of media contacting surfaces defines a first end, a second end and a mid-point wherein the first end and the second end are closer to the longitudinal axis than the mid-point for forming convex media contacting surfaces.

As discussed above, the roller assembly may be mounted on a handle. Alternatively, the rollers or roller assembly may be mounted on a towable assembly, such as a tractor, snow cat, or other towable apparatus. Similarly, the plowing members may be handle mounted or, alternatively the plowing members are mounted on a towable assembly.

BRIEF DESCRIPTION OF THE DRAWINGS

Other objects and advantages of the invention will become apparent upon reading the following detailed description and upon reference to the drawings in which:

FIG. 8 is a cross-sectional view taken along the line 8-8 of FIG. 6;

FIG. 12 is an end elevation view of a roller assembly in accordance with the invention smoothing an expanse of granular media;

While the invention will be described in conjunction with preferred embodiments thereof, it will be understood that it is not intended to limit the invention to those embodiments or to the details of the construction or arrangement of parts illustrated in the accompanying drawings.

DETAILED DESCRIPTION OF THE PREFERRED EMBODIMENTS

Figure 1:
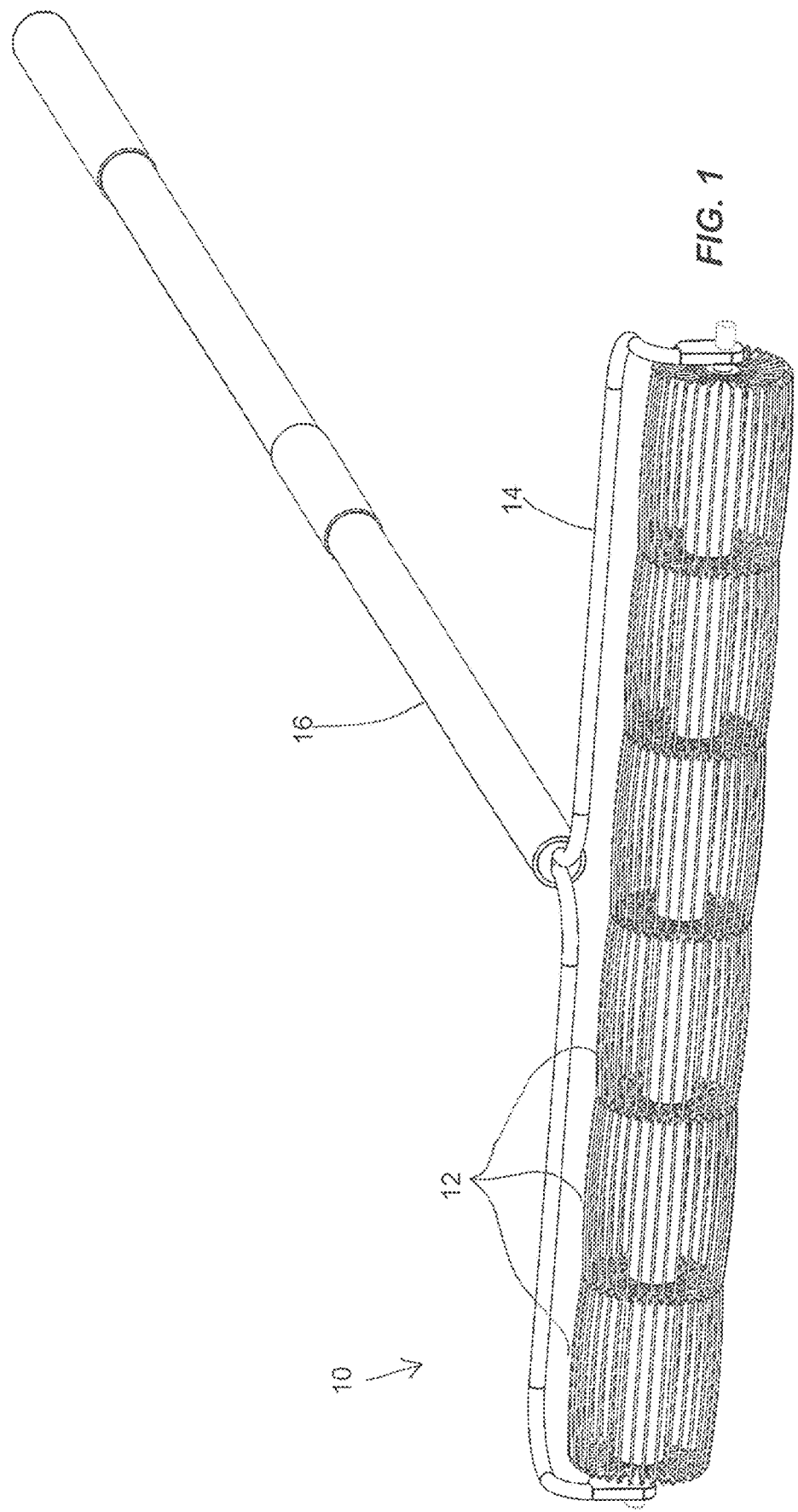
FIG. 1 is a perspective view of a six roller embodiment of a roller assembly in accordance with the invention.

Looking at FIG. 1, an embodiment of a roller assembly for smoothing an expanse of granular media, such as the sand in a golf bunker (not shown), has a roller assembly 10 having one or more rollers 12. In the embodiment of FIG. 1, multiple serially-aligned rollers 12 are connected by a yoke 14 to an elongated handle 16. As seen in the embodiment of FIG. 1, roller assembly 10 has six rollers 12. However, embodiments of roller assembly 10 may have one roller 12 or any number of rollers 12.

Figure 2:
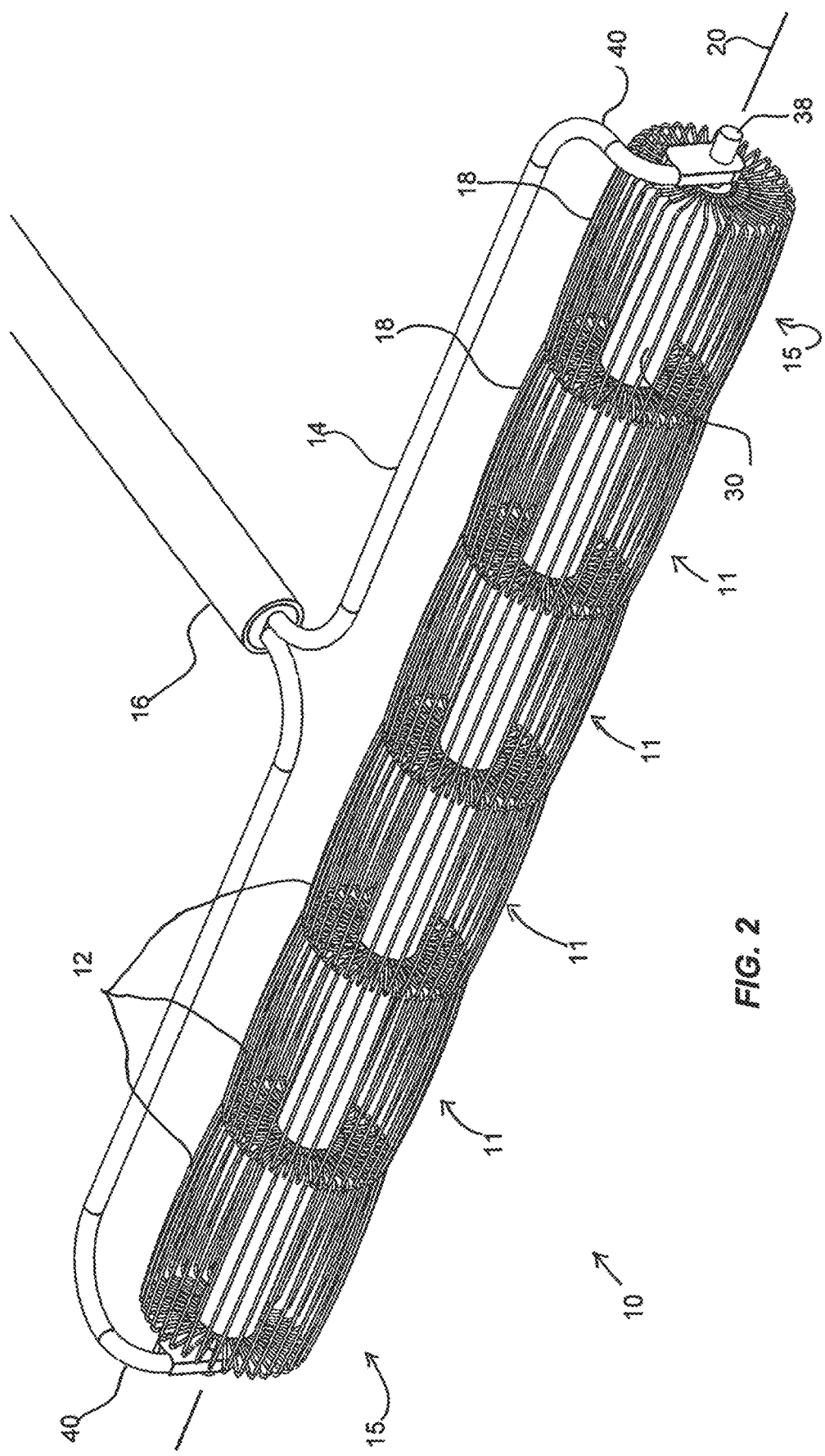
FIG. 2 is an enlarged perspective view of the roller end of the embodiment of FIG. 1.

As better seen in FIG. 2, the multiple serially-aligned rollers 12 of roller assembly 10 embodiment of FIG. 1 taken together have a generally cylindrical contour, but each of rollers 12 individually display a convex roller surface 18 in relation to a longitudinal axis 20 on which rollers 12 are aligned. The convexity illustrated is exemplary and may be more pronounced.

Figure 3A:
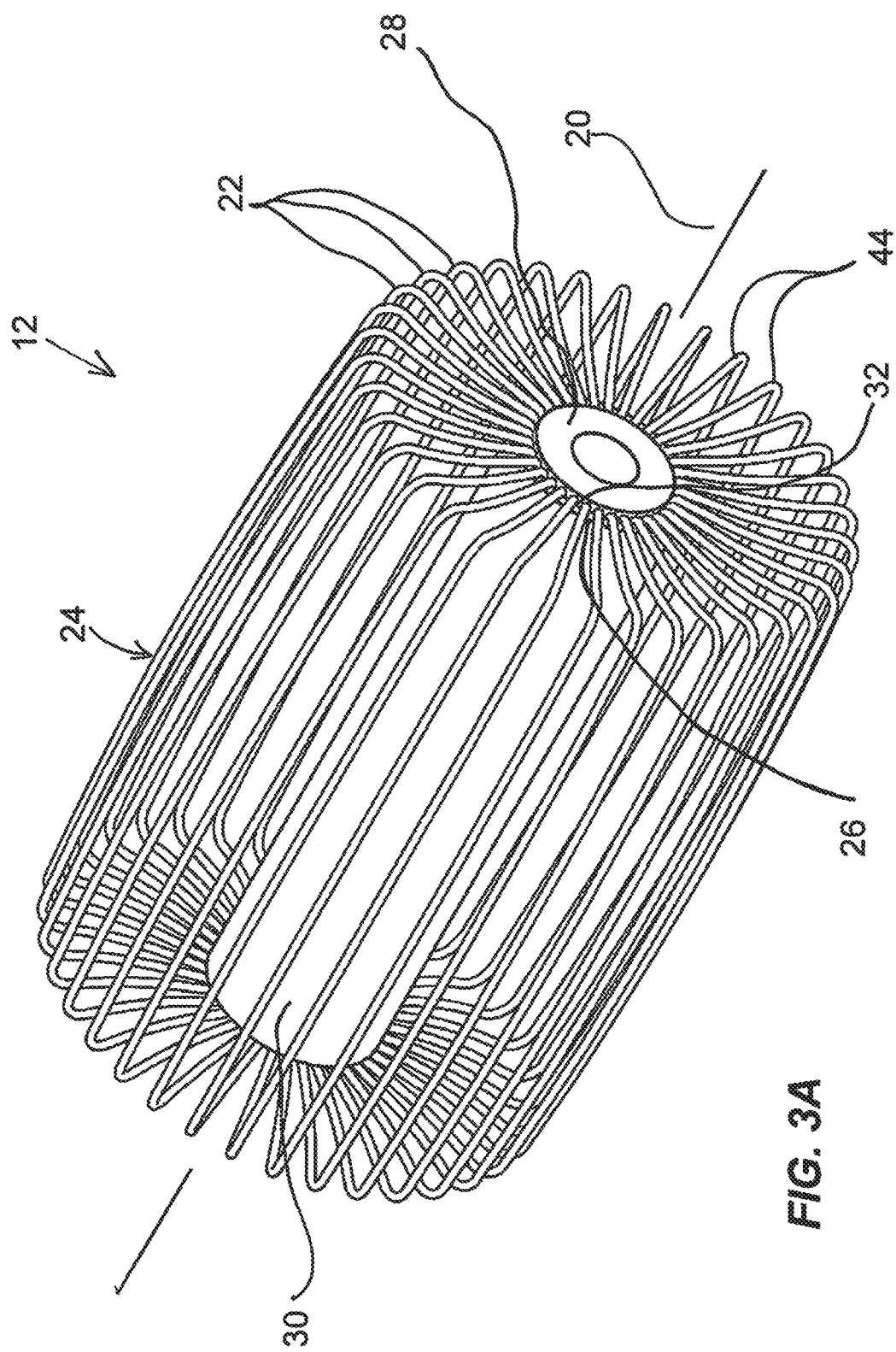
FIG. 3A is an enlarged perspective view of an embodiment of one roller of the roller assembly of FIG. 1.
Figure 3B:
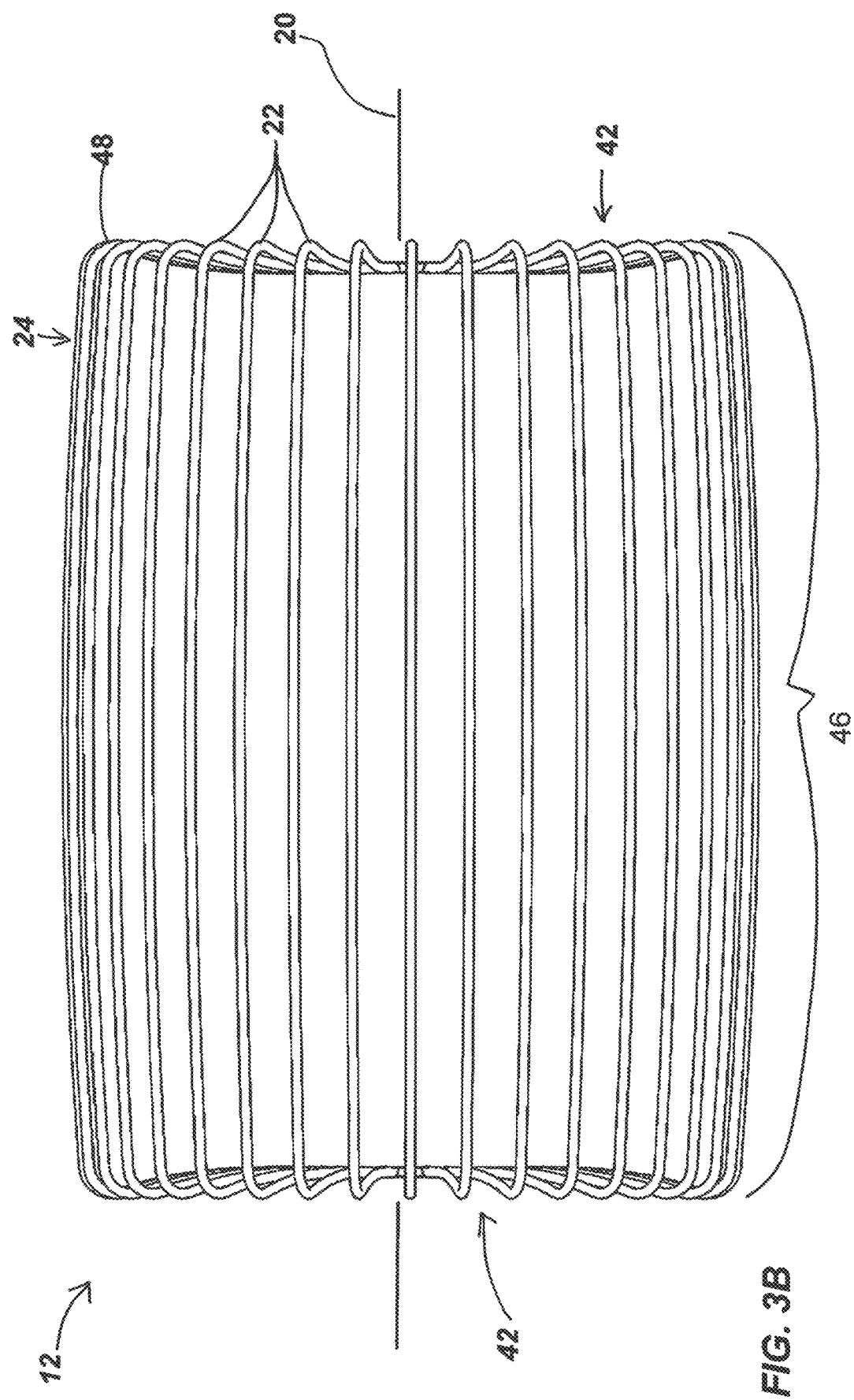
FIG. 3B is an enlarged top plan view of the roller of FIG. 3A.

Turning to FIGS. 3A and 3B, an embodiment of each roller 12 seen in FIGS. 1 and 2 is shown. Rollers 12 have an array of wires 22 spaced from the common longitudinal axis 20 to define a convex roller surface 24. In the embodiment shown, each wire 22 of the array is disposed in a corresponding radial plane emanating from common longitudinal axis 20. As shown, the radial planes and wires 22 of the array are preferably spaced at equal angular increments about common longitudinal axis 20.

Continuing to look at FIGS. 3A and 3B, rollers 12 have two bushings 26, one at each end of rollers 12. Opposite ends of each wire 22 are fixed to a corresponding one of the bushings 26.

Each bushing 26 cooperates with a corresponding ring 28 to clamp ends of the wires 22 in a corresponding annulus between bushing 26 and the ring 28. As shown in the embodiment of FIGS. 1-3A of roller assembly 10, the corresponding rings 28 are the end portions of a unitary tube 30.

Each of the bushings 26 has a longitudinal concentric opening 32.

Returning to FIGS. 1 and 2, a common shaft 38 aligned on common longitudinal axis 20 of roller assembly 10 extends through the concentric openings 32 of the bushings 26 of each roller 12. Shaft 38 is connected between the arms 40 of yoke 14. Handle 16 extends from yoke 14 in a direction transverse to shaft 38 and to tubes 30. The bushings 26 are rotatable on the shaft 38 about common longitudinal axis 20 of shaft 38. Preferably, and as shown, the end portions 42 of wires 22 of juxtaposed rollers 12 are arranged in an overlapping alternating-mesh sequence.

Returning to FIGS. 3A and 3B, in a preferred configuration providing the overlapped alternating-mesh sequence, each wire 22 has generally radial portions 44 extending inward from the ends of its lengthwise convex portion 46 toward longitudinal axis 20. However, as best seen in FIG. 3B, it is preferred that the angle at junction 48 of each radial portion 44 and convex portion 46 of a wire 22 be such that an array of wires 22 forms a cogwheel transverse to longitudinal axis 20 on each longitudinal end of roller 12. When juxtaposed rollers 12 are longitudinally tightly aligned on shaft 38, the cogwheels of juxtaposed rollers 12 overlap and engage so that all of rollers 12 of roller assembly 10 rotate in unison about common longitudinal axis 20.

As used herein, the term "wire" includes filaments of metallic, plastic and/or fibrous material. It is preferred that at least the convex portion 46 of each wire 22 of each roller 12 be resiliently flexible to distort inwardly in response to increasing force of contact with, and to recover during release of force of contact from, the granular media as roller assembly 10 rotates about common longitudinal axis 20 on the expanse of granular media.

Wires 20, 320, 420, discussed below, or other wire embodiments discussed herein may be constructed of various materials and dimensions. In one embodiment, material of wires 20, 320, 420 is AISI 302 stainless steel, spring tempered. This material has a tensile strength in the range of 189-319 ksi. Other stainless alloys may also be used, including 17-7 PH with a tensile strength range from 235-335 ksi. Other stainless steel alloys could be used including, AISI 304 and 316. A benefit of 17-7 over 302/304 is that the 17-7 is heat treatable by precipitation hardening, to get required strength and formability.

Wires 20, 320, 420 are loaded transverse to their axis. They are manufactured and assembled with an outward, or convex, curvature (i.e., bowing) along their length. When loaded, wires 20, 320, 420 are compressed or pushed to essentially a straight configuration, and can assume a reverse curvature when a larger radial load is imposed. The transverse compression or deflection of wires 20, 320, 420 results in a radial stiffness, per wire, equal to:

$$k = \frac{\Delta F}{\Delta y}$$

where $\Delta F$ is the total radial (transverse) force taken by one wire 20, 320, 420 and $\Delta y$ is the corresponding maximum transverse deflection. The stiffness value for a single wire 20, 320, 420 can be shown to be:

$$k = A\frac{EI}{L^3}$$

Where E is the modulus of elasticity for the spring wire 20, I is the moment of inertia for the cross sectional area of wire 20

(e.g., $\frac{\pi}{64}d^4$)

for a wire of diameter, d, or $$\frac{d^4}{12}$$

for a square d×d wire) and L is its length. A is a constant of proportionality, dependent on the end conditions of wire 20 and the shape of the transverse load distribution. For example, if the ends are simply supported and the load is assumed to be uniformly distributed along the length of wire 20, A=76.8. If the load is assumed to sinusoidal, with a maximum in the center, A=$\pi^2$.

The length of the radial ends of the wires 20, 320, 420, and their curvature from the radial to the transverse section, also contribute to the overall wire stiffness, primarily by affecting the value of A.

The equation for stiffness, k, is useful for selecting wires 20, 320, 420 with identical stiffness over differing lengths. For example, if a round wire11 has a diameter of $d_1$ (and a corresponding moment of inertia, $I_1$) has good stiffness properties at a length of $L_1$, and we want a wire-2 with the same stiffness at a length of $L_2$, then we want:

$$\frac{I_1}{L_1^3} = \frac{I_2}{L_2^3}$$

Or $$I_2 = \frac{I_1 L_2^3}{L_1^3} = \frac{\pi}{64}d_2^4$$

For example, a 17" long wire with a diameter of 0.072" has the same stiffness as a 24" wire with a diameter of 0.093".

The overall downward stiffness of an individual roller depends on the stiffness of each wire 20, 320, 420, and the number of wires 20, 320, 420 around the circumference. The more wires 20, 320, 420 on a given roller, the greater its overall stiffness.

As an example, a wire, 20, 320, 420 having a diameter of d1 of 0.072" and a length L1 of 17" and a moment of inertia $I_1$ of 1.319×10$^{-6}$ inches$^4$ has been found to be effective. Below, in Table 1, are example wire diameters d2 for different lengths L2 from 6 inches to 36 inches.

TABLE 1

| $L_2$ (in) | $I_2$ (in$^4$) | $d_2$ (in) |
| --- | --- | --- |
| 6 | 5.80E-08 | 0.033 |
| 7 | 9.21E-08 | 0.037 |
| 8 | 1.37E-07 | 0.041 |
| 9 | 1.96E-07 | 0.045 |
| 10 | 2.69E-07 | 0.048 |
| 11 | 3.57E-07 | 0.052 |
| 12 | 4.64E-07 | 0.055 |
| 13 | 5.90E-07 | 0.059 |
| 14 | 7.37E-07 | 0.062 |
| 15 | 9.06E-07 | 0.066 |
| 16 | 1.10E-06 | 0.069 |
| 17 | 1.32E-06 | 0.072 |
| 18 | 1.57E-06 | 0.075 |
| 19 | 1.84E-06 | 0.078 |
| 20 | 2.15E-06 | 0.081 |
| 21 | 2.49E-06 | 0.084 |
| 22 | 2.86E-06 | 0.087 |
| 23 | 3.27E-06 | 0.090 |
| 24 | 3.71E-06 | 0.093 |
| 25 | 4.20E-06 | 0.096 |
| 26 | 4.72E-06 | 0.099 |
| 27 | 5.28E-06 | 0.102 |
| 28 | 5.89E-06 | 0.105 |
| 29 | 6.55E-06 | 0.107 |
| 30 | 7.25E-06 | 0.110 |
| 31 | 8.00E-06 | 0.113 |
| 32 | 8.80E-06 | 0.116 |
| 33 | 9.65E-06 | 0.118 |
| 34 | 1.06E-05 | 0.121 |
| 35 | 1.15E-05 | 0.124 |
| 36 | 1.25E-05 | 0.126 |

The above table is provided for the purposes of example only. Other diameters are also believed to be suitable, including diameters of +/−3% from the listed diameters.

Figure 4A:
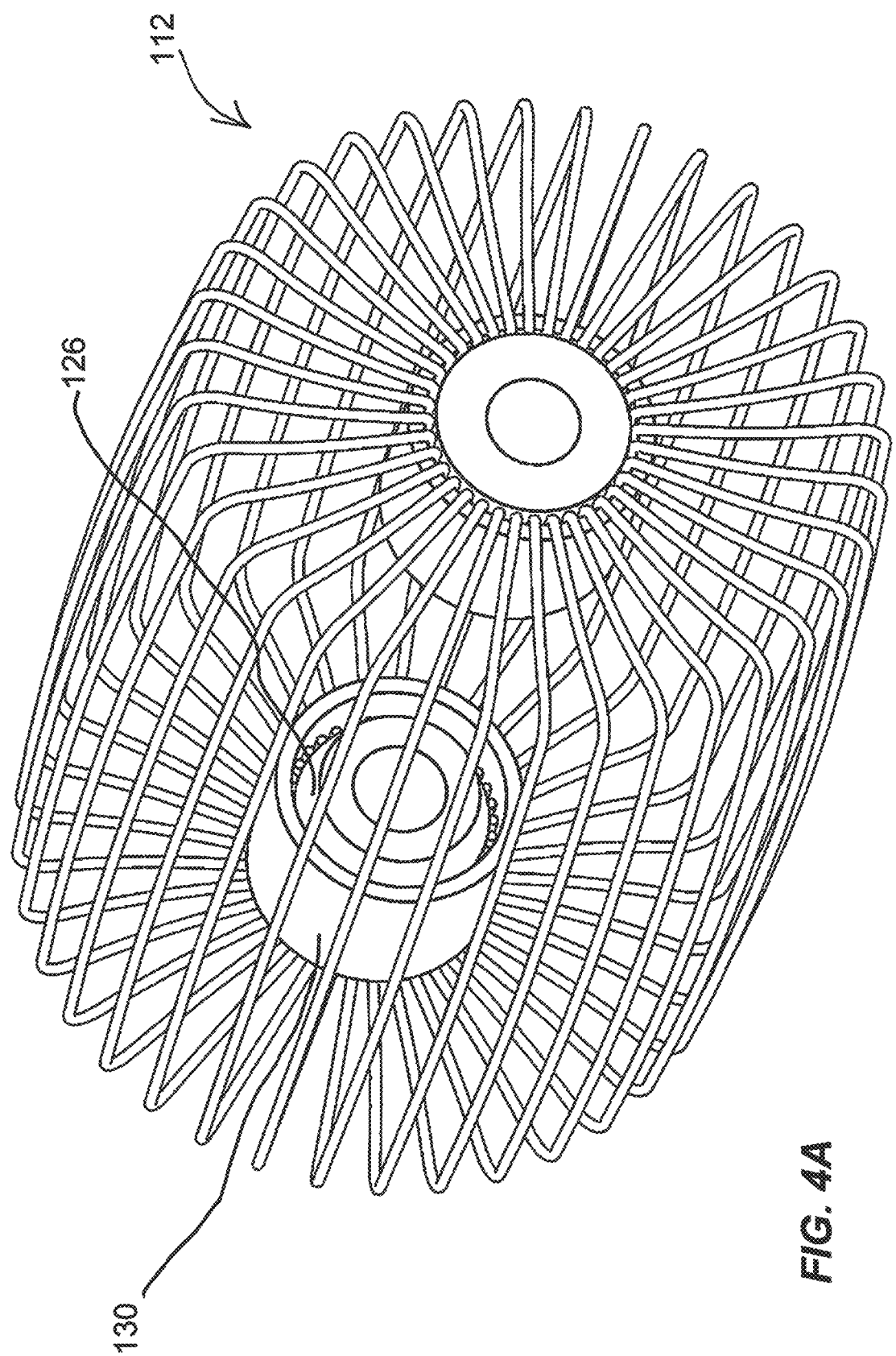
FIG. 4A is an enlarged perspective view of an another embodiment of one roller of a roller assembly in accordance with the invention.
Figure 4B:
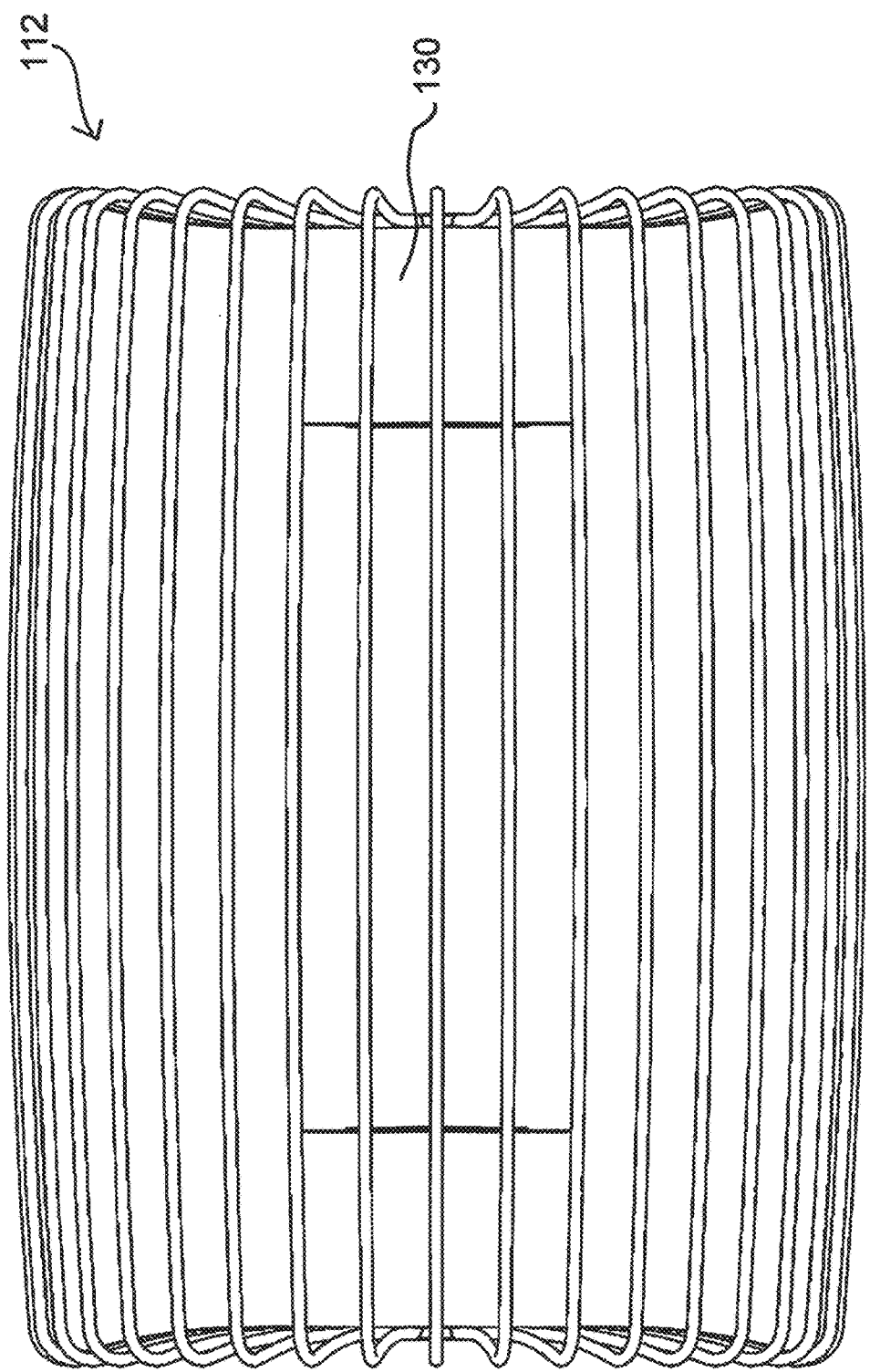
FIG. 4B is an enlarged top plan view of the roller of FIG. 4A.

Turning to FIGS. 4A and 4B, another embodiment of a roller for use in roller assembly 10 is shown, i.e., roller 112, which is in all respects the same as the embodiment of roller 12 of FIGS. 3A and 3B, except that bushings 126 are not part of a unitary tube but are independent of each other, i.e., bushings 126 are located within tube segments 130.

Figure 5A:
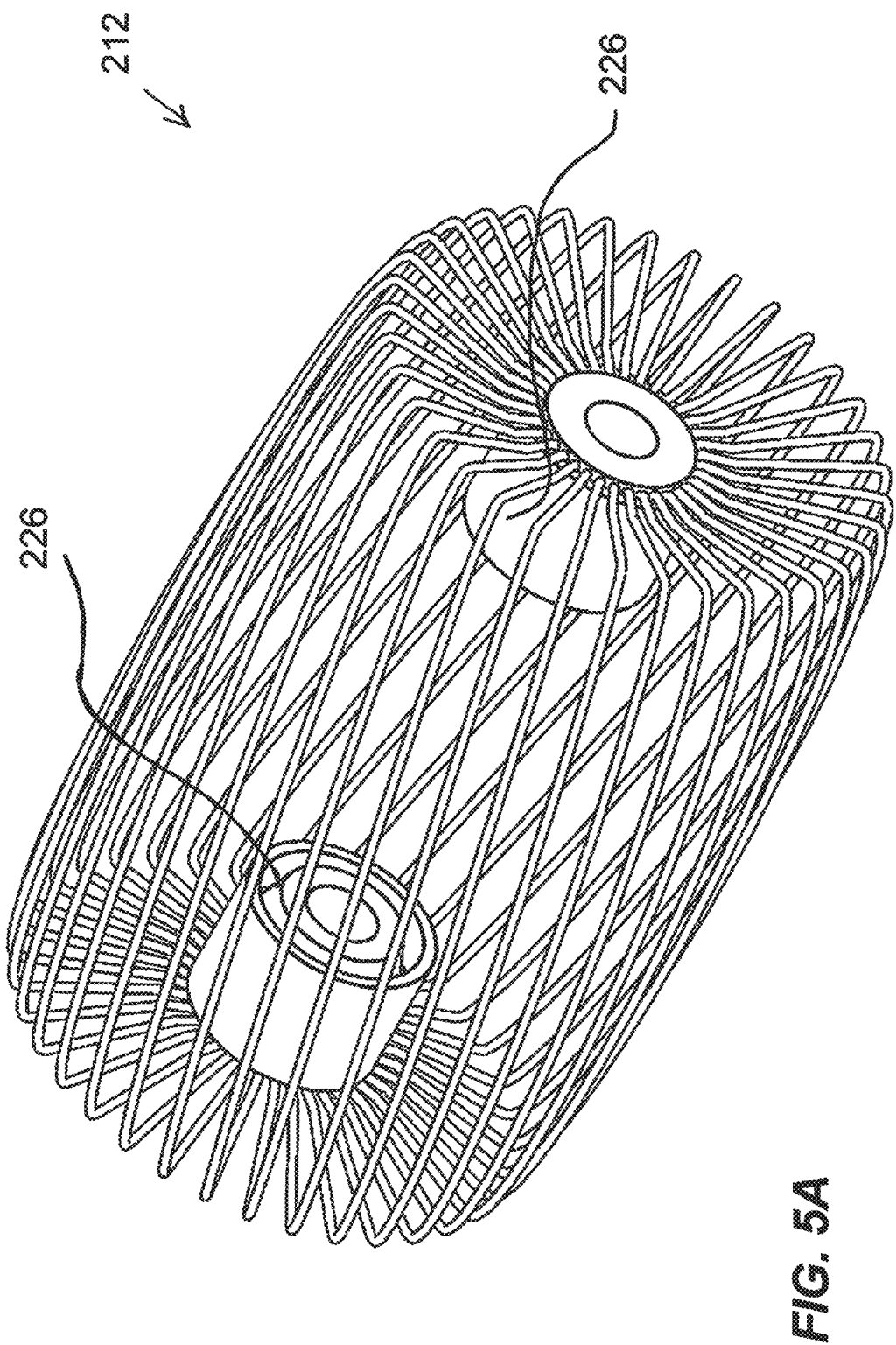
FIG. 5A is an enlarged perspective view of an another embodiment of one roller of a roller assembly in accordance with the invention.
Figure 5B:
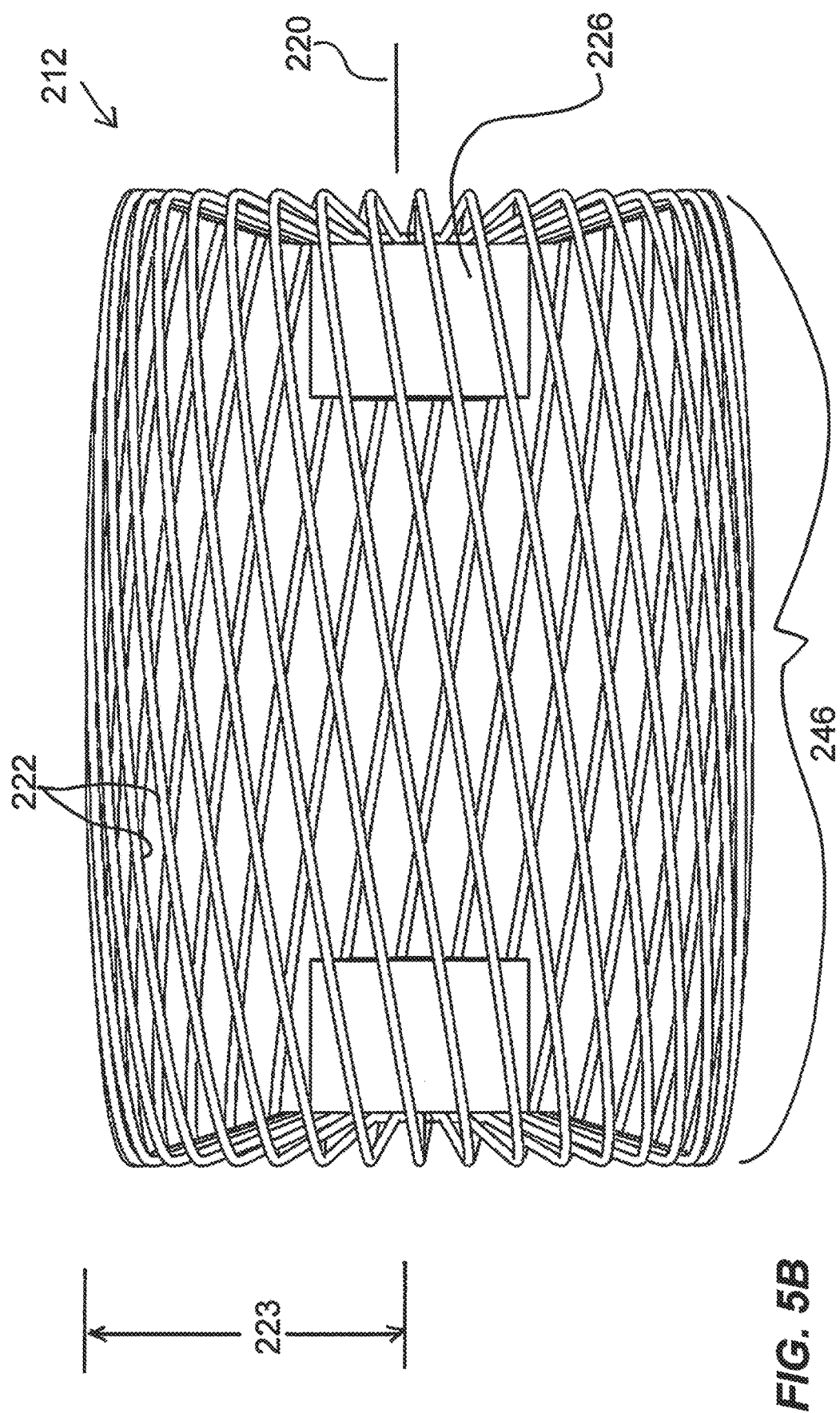
FIG. 5B is an enlarged top plan view of the roller of FIG. 5A.

Moving on to FIGS. 5A and 5B, yet another embodiment of a roller for use in roller assembly 10 is shown, i.e. roller 212, is shown in which each wire 222 of the array extends between corresponding radii 223, which emanate from the longitudinal axis 220 but are in different radial planes relative to longitudinal axis 220. Thus, convex portions 246 of wires 222 are not parallel to longitudinal axis 220. Preferably, wires 222 of the array are spaced at equal angular increments about longitudinal axis 220 so that, while convex portions 246 of wires 222 are not parallel to longitudinal axis 220, they are parallel to each other.

As shown in FIGS. 5A and 5B, roller 212 has independent bushings 226 as in the embodiment of FIGS. 4A and 4B, but bushings 226 could also be the unitary type described in relation to FIGS. 3A and 3B.

Figure 6:
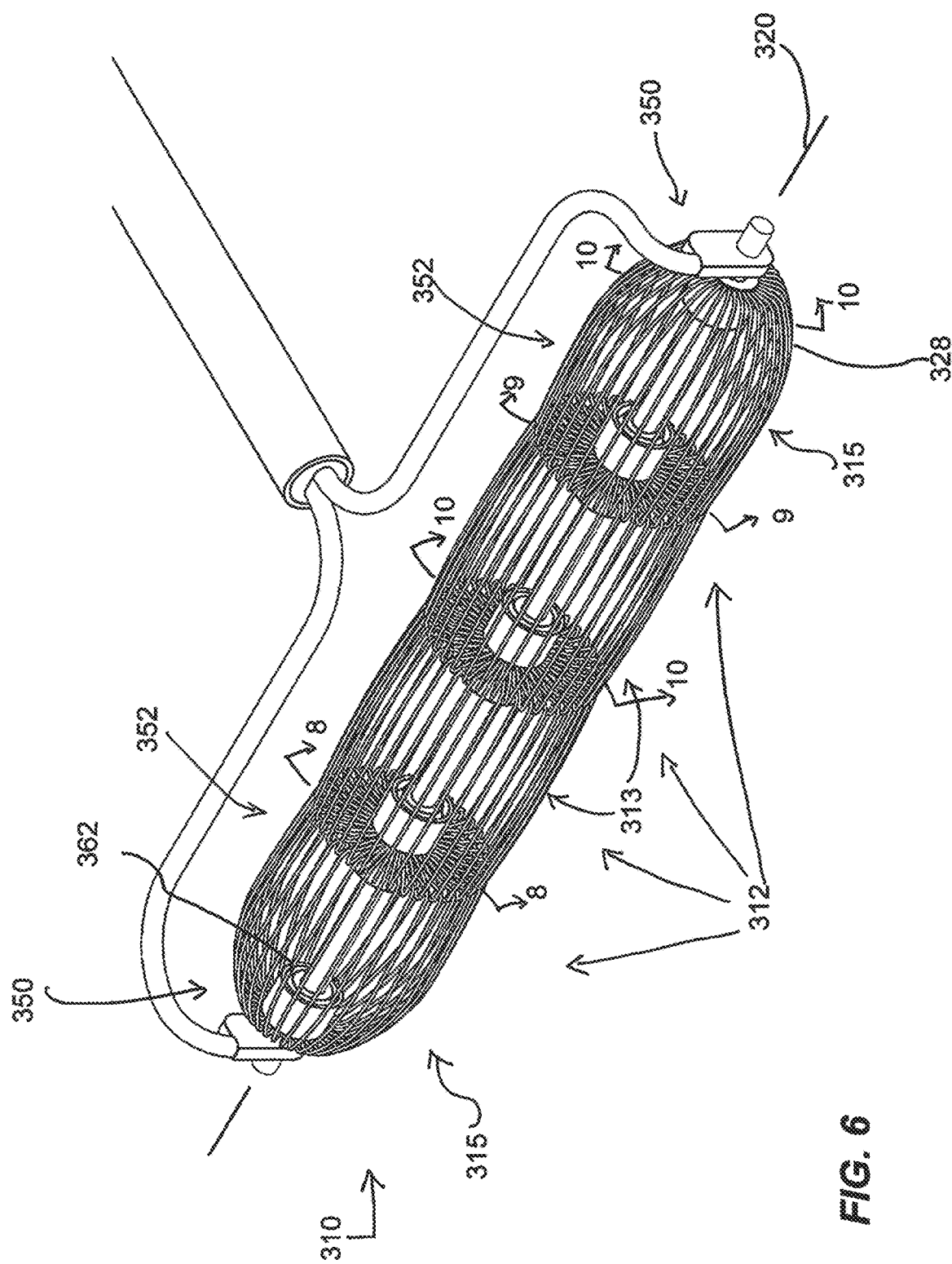
FIG. 6 is an exploded perspective view of the roller end of a four roller embodiment of a roller assembly in accordance with the invention.
Figure 7:
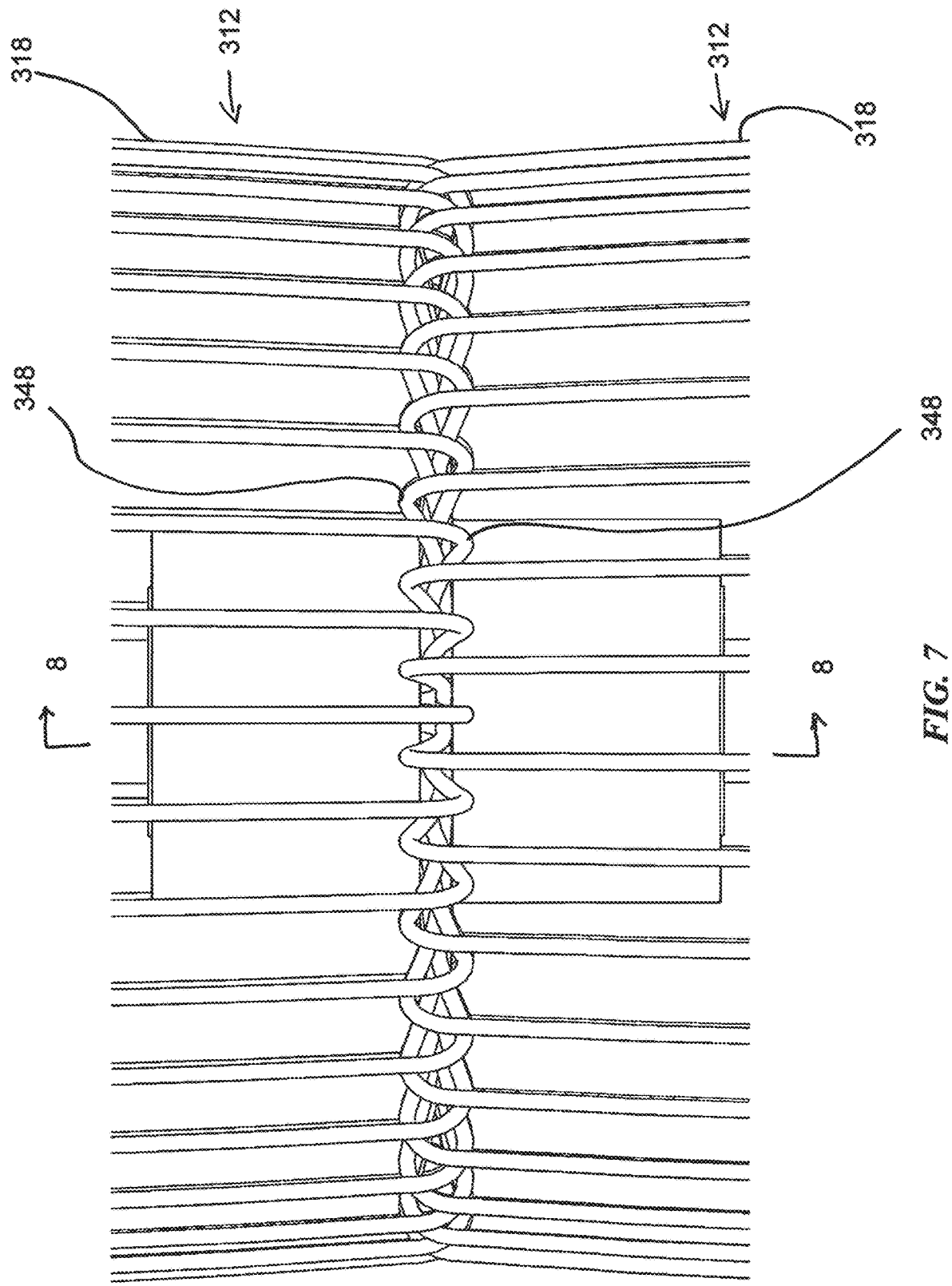
FIG. 7 is an enlarged partial top plan view of an interface of juxtaposed rollers of a roller assembly in accordance with the invention.
Figure 9:
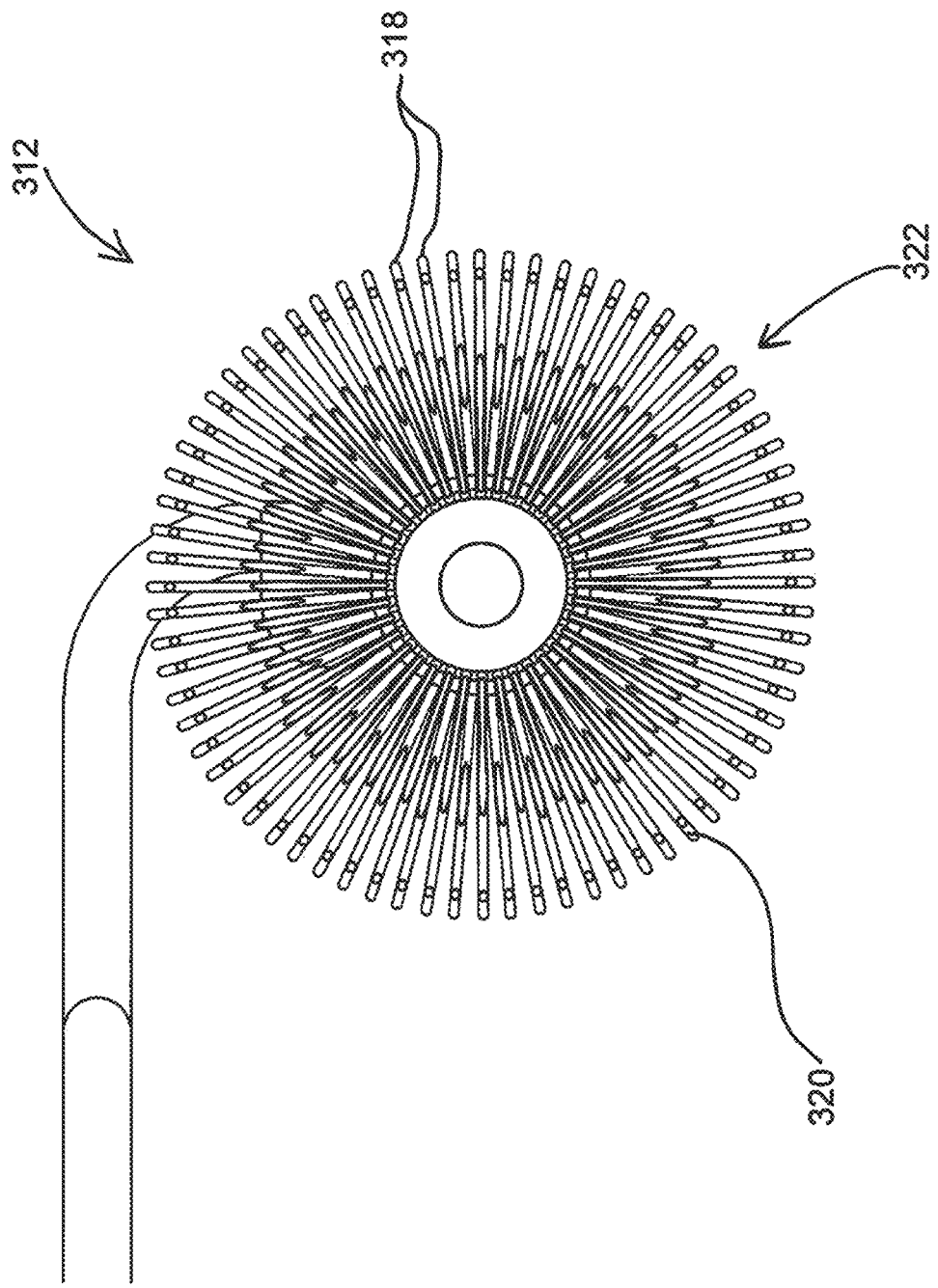
FIG. 9 is a cross-sectional view taken through a bearing of a roller assembly in accordance with the invention in a plane transverse to the longitudinal axis of the roller assembly taken along line 9-9 of FIG. 6.
Figure 10:
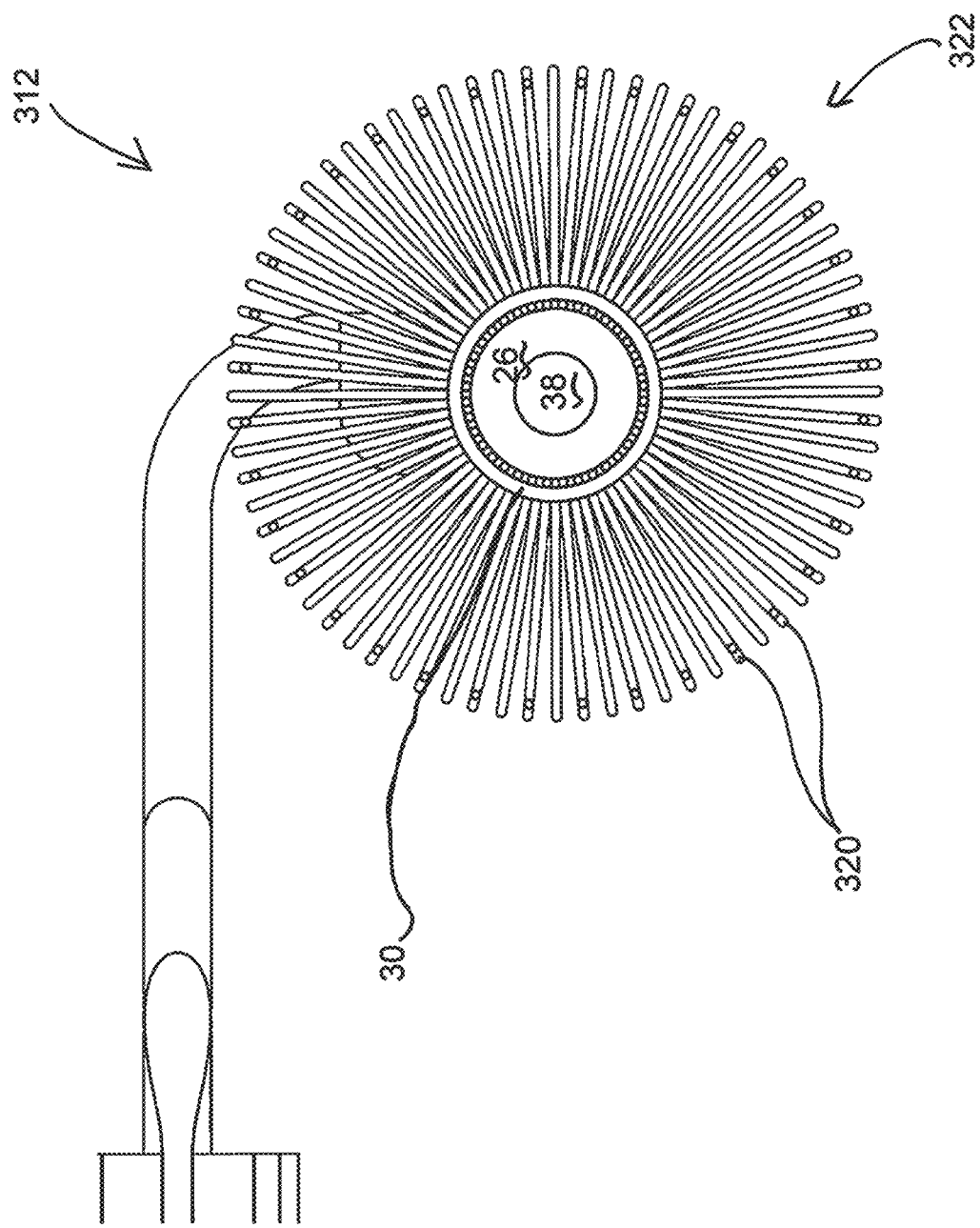
FIG. 10 is a cross-sectional view taken through a bearing of a roller assembly in accordance with the invention in a plane transverse to the longitudinal axis of the roller assembly taken along line 10-10 of FIG. 6.
Figure 11:
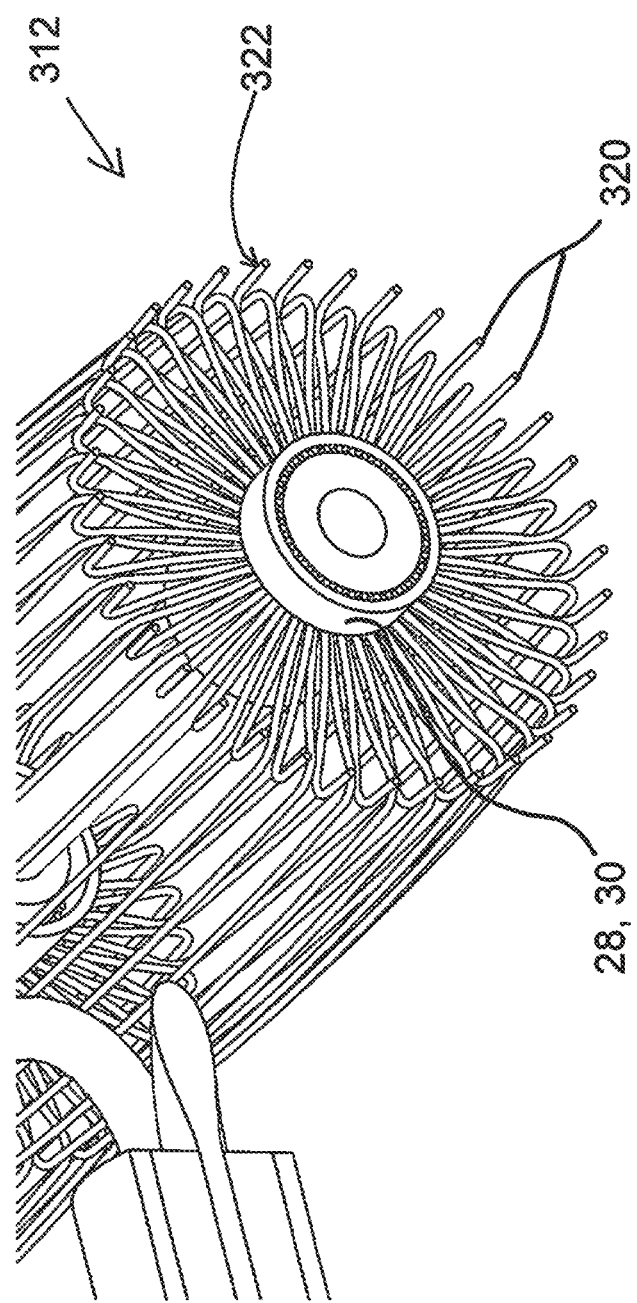
FIG. 11 is an enlarged partial perspective view of an interface of juxtaposed rollers of the roller assembly in accordance with the invention.

Looking now at FIG. 6, another embodiment of the roller assembly, i.e., roller assembly 310, has four rollers 312. Four rollers 312 include two intermediate rollers 313 that are the same as rollers 12 described in relation to FIGS. 3A and 3B. Four rollers 312 also two outer rollers 315 having outer portions 350 with convexities that are more arcuate than the convexity of their inner portions 352 and curve toward longitudinal axis 320 so that their ends are fixed to their respective bushings 326, as shown clamped in the annuluses between the bushings 326 and their respective rings 328.

In any multiple roller embodiment, end rollers 315 as seen in FIG. 6 can be used in conjunction with intermediate rollers 313 as seen in FIGS. 3A and 3B, FIGS. 4A and 4B or FIGS. 5A and 5B. Rollers 312 have an array of wires 322 spaced from a common longitudinal axis 320 to define a convex roller surface 324. In the embodiment shown, each wire 322 of the array is disposed in a corresponding radial plane emanating from common longitudinal axis 320. Roller assembly 310 has bushings 326, i.e., one at each end of rollers 312. Opposite ends of wires 322 are fixed to a corresponding one of bushings 326. Each bushing 326 cooperates with a corresponding ring 325 to clamp ends of wires 322 in a corresponding annulus between bushing 326 and ring 328. Bushings 326 are mounted on shaft 338.

For single roller embodiments, any of the rollers 12 seen in FIGS. 3A and 3B, rollers 112 of FIGS. 4A and 4B or rollers 212 of FIGS. 5A and 5B can be used or a single roller with outer portions 350 as seen in FIG. 6 on both ends of the roller can be used.

FIGS. 7-11 illustrate bushing 26, ring 28 and tube 30 and annulus connection of the wires 22 of the overlapped alternating-mesh sequence of opposed ends of the various multi-roller embodiments of the roller assembly in several planes transverse to longitudinal axis 120 of those embodiments.

Turning to FIG. 12, the operation of the various embodiments of roller assembly 10, 310 will be understood from an exemplary explanation applied to a six roller assembly 10. Six roller assembly 10 includes six rollers 12. Six rollers 12 include four intermediate rollers 12 according to FIGS. 4A and 4B and two end rollers 15, which may be of similar construction to rollers 12 or to end rollers 15 according to FIG. 6, with the juxtaposed rollers 12-12 or 12-315 in their overlapped alternating-mesh sequence for simultaneous rotation about common longitudinal axis 20 of roller assembly 10.

Still referring to FIG. 12, using handle 16, a user can push, pull or alternately push and pull on the expanse of granular media such as the sand, snow, dirt, etc. S, applying modest downward pressure to cause the rollers 12 and 15 to rotate in unison about common longitudinal axis 20 on the expanse of granular medias. The rotation of the convex roller surfaces 18 of the wires 22 of the various rollers 12 and 15 about common longitudinal axis 20 will fling some of the granular media outwardly of the rollers 12 and 15 of roller assembly 10. In addition to providing simultaneous rotation of the rollers 12 and 15, the overlapped alternating-mesh sequence assures distribution of granular media S across the length of the serial arrangement of rollers 12 and 15. Furthermore, the more arcuate convexity of the outer portions of the end rollers 15 provides a smoother transition of rolled granular media S with granular media S adjacent the path of roller assembly 10. As the wires 22 forming the roller surfaces rotate about longitudinal axis 20 on the expanse of granular media S, at least some of the granular media S is flung outwardly of the roller assembly 10. The flung granular media S appears to form a cloud C of granular media S of decreasing density in radially outward directions from longitudinal axis 20 and of increasing density and distance from the leading to the trailing direction of roller assembly 10.

Figure 13A:
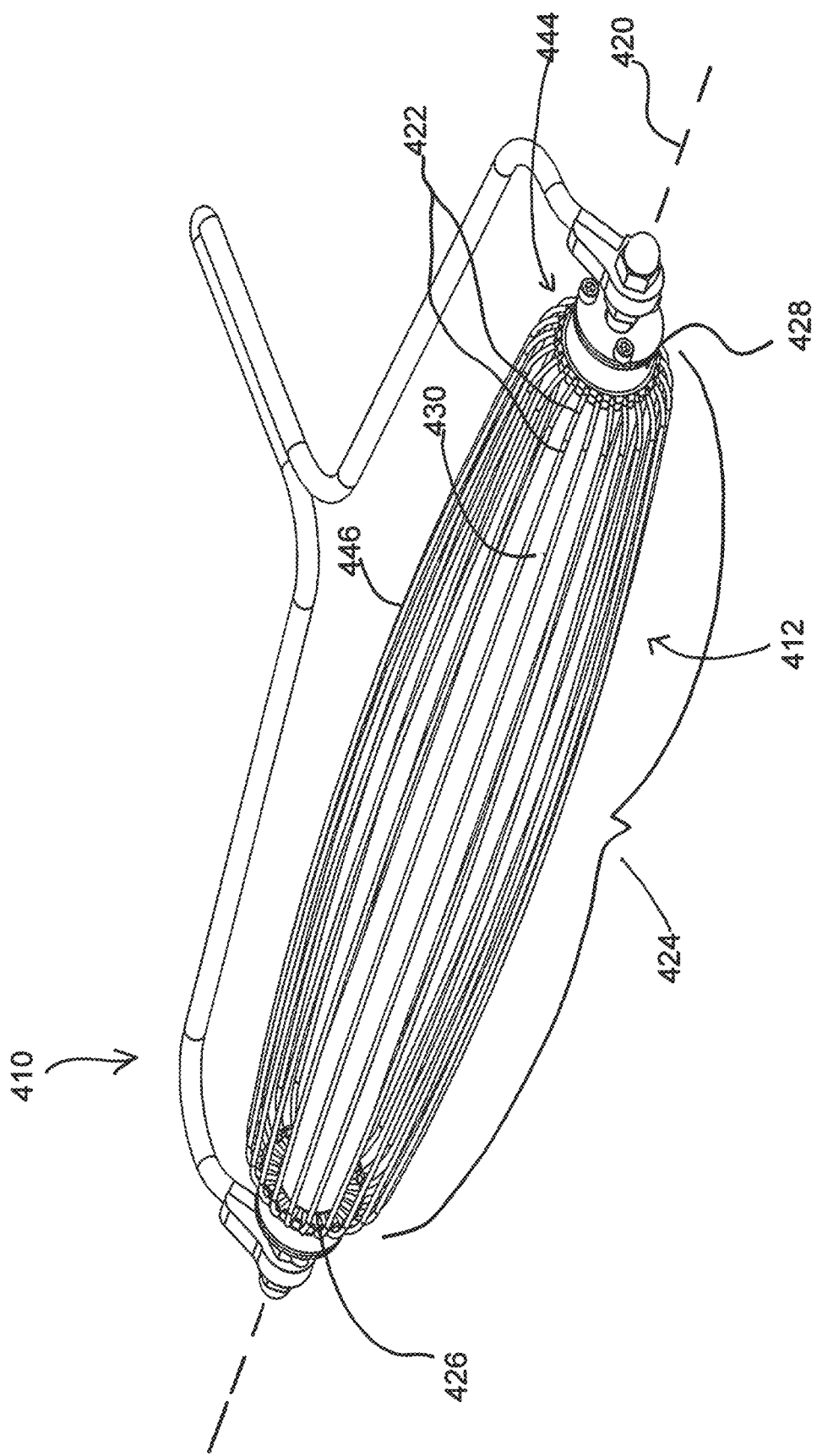
FIG. 13A is a perspective view of a single roller embodiment of a roller assembly in accordance with the invention.
Figure 13B:
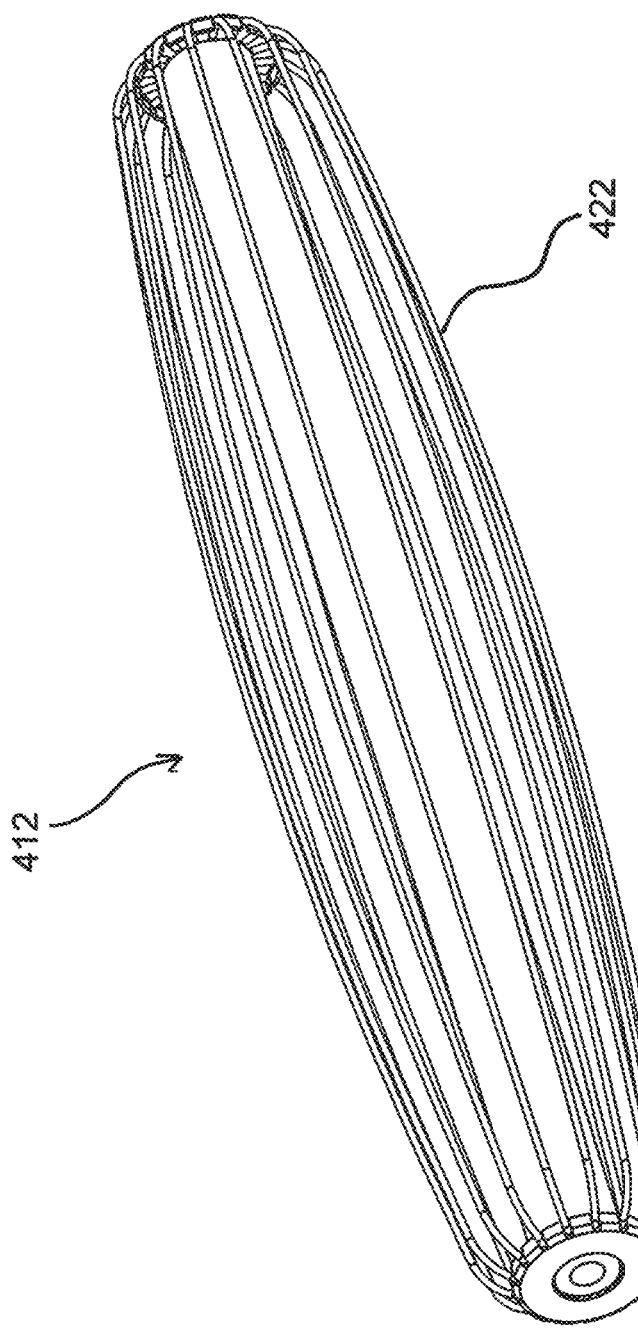
FIG. 13B shows a 16 wire embodiment of the roller of FIG. 13A.
Figure 14:
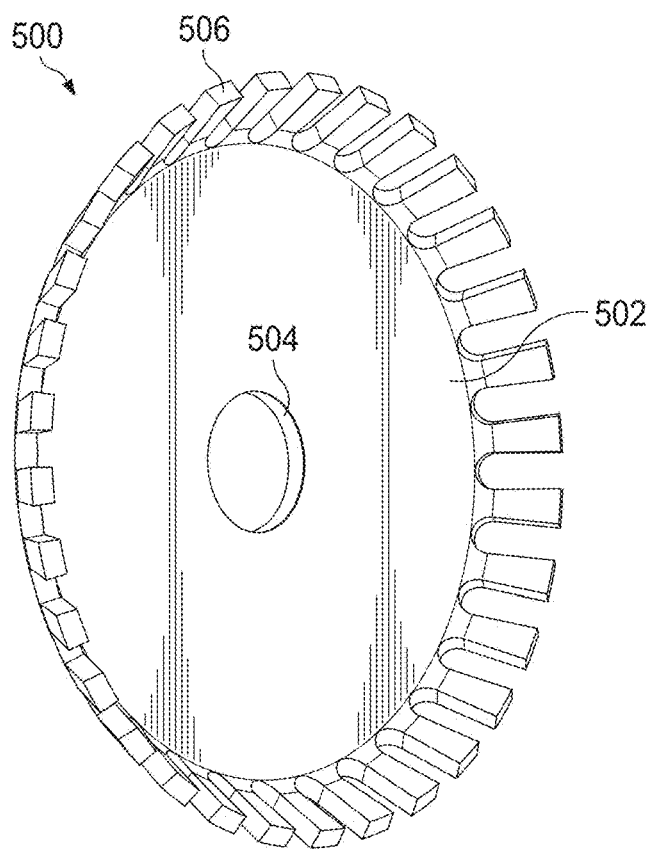
FIG. 14 is a perspective view of a roller assembly end cap.
Figure 15:
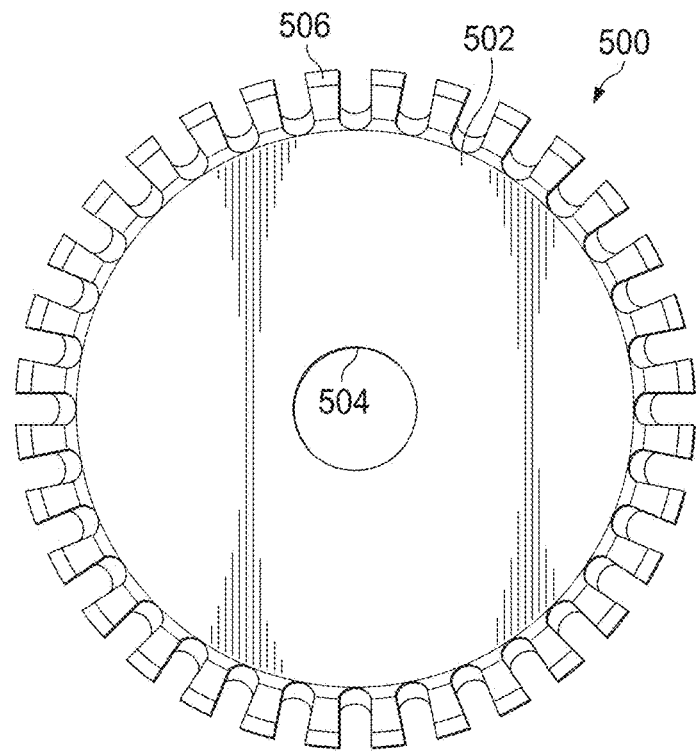
FIG. 15 is an elevation view of the end cap of FIG. 13.

Turning to FIGS. 13A-13B, shown is a single roller embodiment, i.e., roller assembly 410. Roller assembly 410 includes a single roller 412. Roller 412 has an array of wires 422 spaced from common longitudinal axis 420 to define a convex roller surface 424. Twenty-four wires 422 are shown in FIG. 13A. Sixteen wires are shown in FIG. 13B. Other embodiments with greater or fewer numbers of wires are also possible. In the embodiments shown, each wire 422 of the array is disposed in a corresponding radial plane emanating from common longitudinal axis 420. As shown, the radial planes and wires 422 of the array are preferably spaced at equal angular increments about common longitudinal axis 420. Roller assembly 410 has two bushings 426, one at each end of roller assembly 410. Opposite ends of each wire 422 are fixed to a corresponding one of the bushings 426. Each bushing 426 cooperates with a corresponding ring 428 to clamp ends of the wires 422 in a corresponding annulus between bushing 426 and the ring 428. Corresponding rings 428 may be the end portions of a unitary tube 430. Each of the bushings 426 has a longitudinal concentric opening. Each wire 422 has generally radial portions 444 extending inward from the ends of its lengthwise convex portion 446 toward longitudinal axis 420.

If the convex portions 446 of the wires 422 are resiliently flexible to distort inwardly in response to increasing force of contact with, and to recover during release of force of contact from, the granular media S as the roller assembly 10, 310, 410 rotates about common longitudinal axis 20, 320, 420 on the expanse of granular media S, the energy of the release appears to enhance the effectiveness of roller assembly 10.

Figure 16:
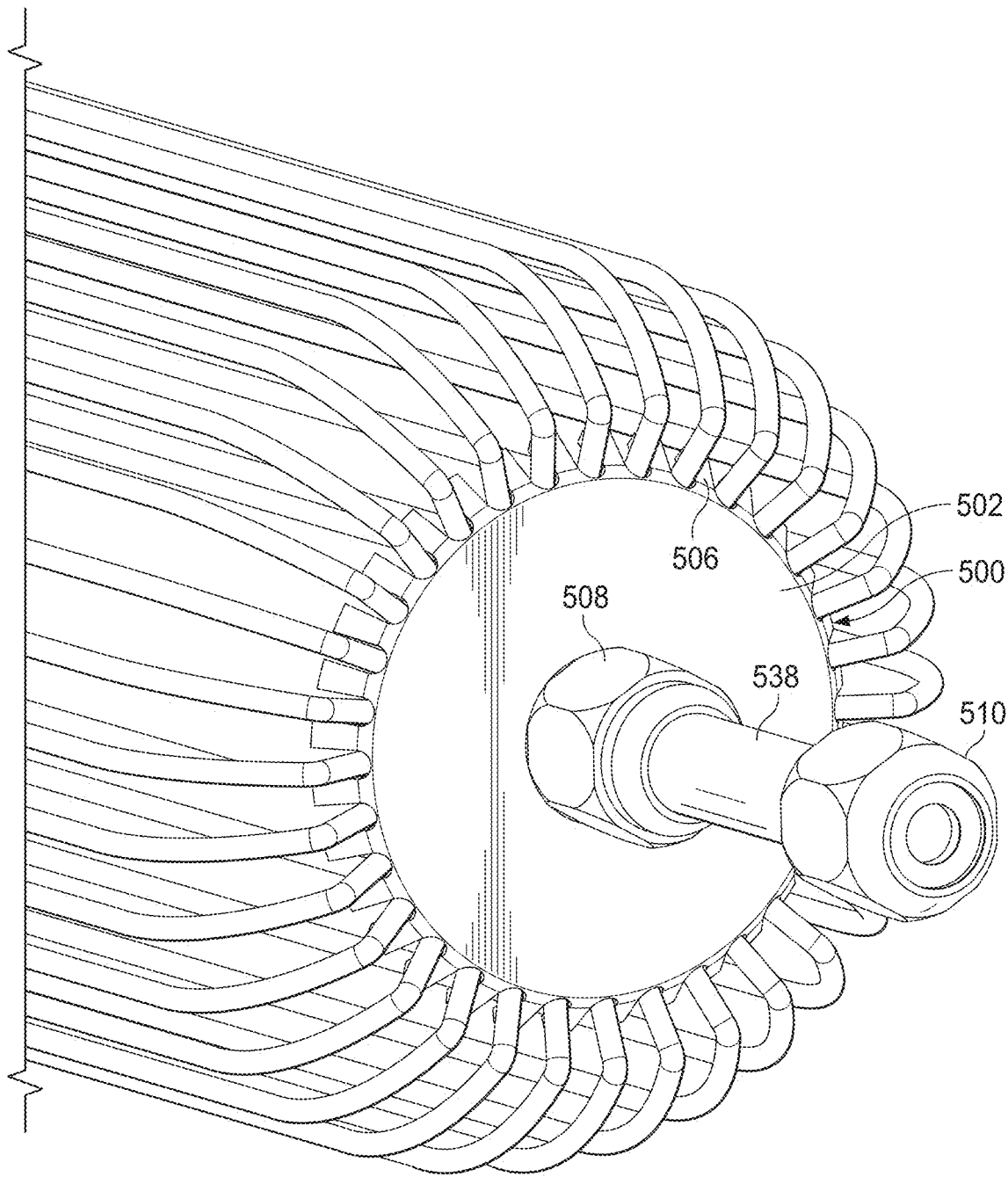
FIG. 16 is a perspective view looking at an outer face of the end cap of FIG. 13 mounted on a roller assembly.
Figure 17:
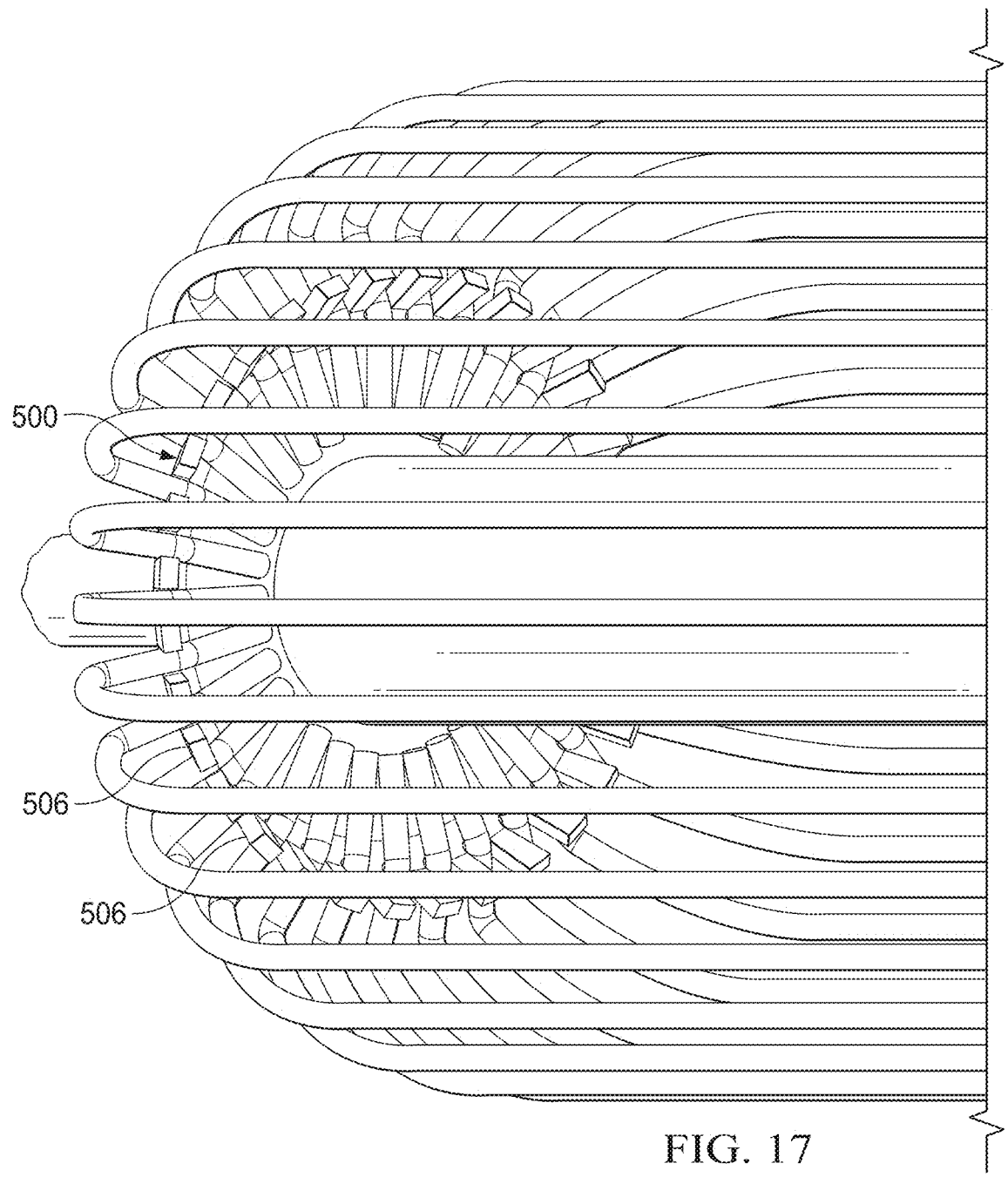
FIG. 17 is an enlarged perspective view of an inner face of the end cap of FIG. 14 mounted on a roller assembly.

Looking at now at FIGS. 14-24, in any of the roller assembly embodiments 10, 310, 410 and particularly in single roller embodiment 410, the possibility that radial portions 44, 344, 444 of the wires 20, 320, 420 of an array will be distorted during operation can be mitigated or avoided by use of end caps 500, one at each end of roller assembly 10, 310, 410. As best seen in FIGS. 14-17, one embodiment of end cap 500 is a disc 502 with a central aperture 504 and a plurality of radial teeth 506 extending outwardly from an outer perimeter of the disc 502 at an obtuse angle relative to an interior face of disc 502. As best seen in FIG. 16, the diameter of disc 502 is greater than an outer diameter of bushing 21 so that protruding teeth 500 extend between the radial portions 44 of sequential wires 22, 322, 422 of the array. The number and width of teeth 506 is such that one tooth 506 protrudes into each space at every angular increment of the array and engages against the radial portions 44, 433, 444 of its respective sequential pair of wires 22, 322, 422. Continuing to look at FIG. 16, each end cap 500 may be secured in engagement with the radial portions 44, 344, 444 of the array of wires 26, for example by a nut 508 threaded on shaft and clamping the end cap 500 against the bias of its respective bushing 538. As shown, shaft 538 extends beyond each nut 508 to a respective outer nut 510. The shaft extension portion 512 between the nuts 508 and 510 can be mounted on respective arms, e.g., 40 of the yoke 14.

In single roller embodiment 400, end caps 500 of ⅛" stainless steel with a disc 502 of 1.5" diameter and teeth ⅜" in length performed satisfactorily with a roller 410 approximately 17 inches wide having bushings 426 of ¾" outer diameter.

Figure 18:
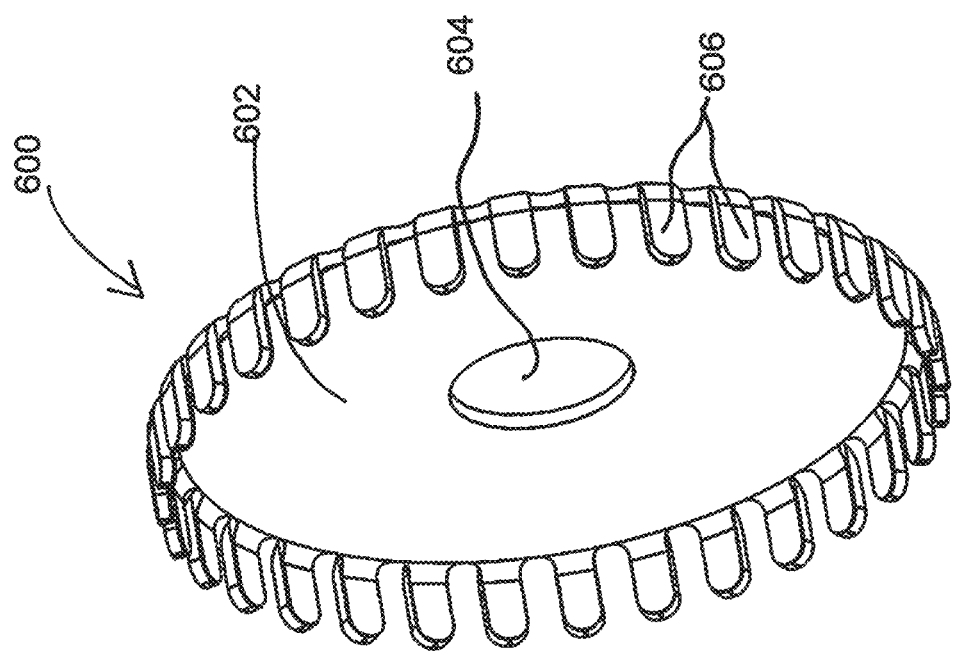
FIG. 18 is a perspective view of an inner face of the end cap of FIG. 17.
Figure 19:
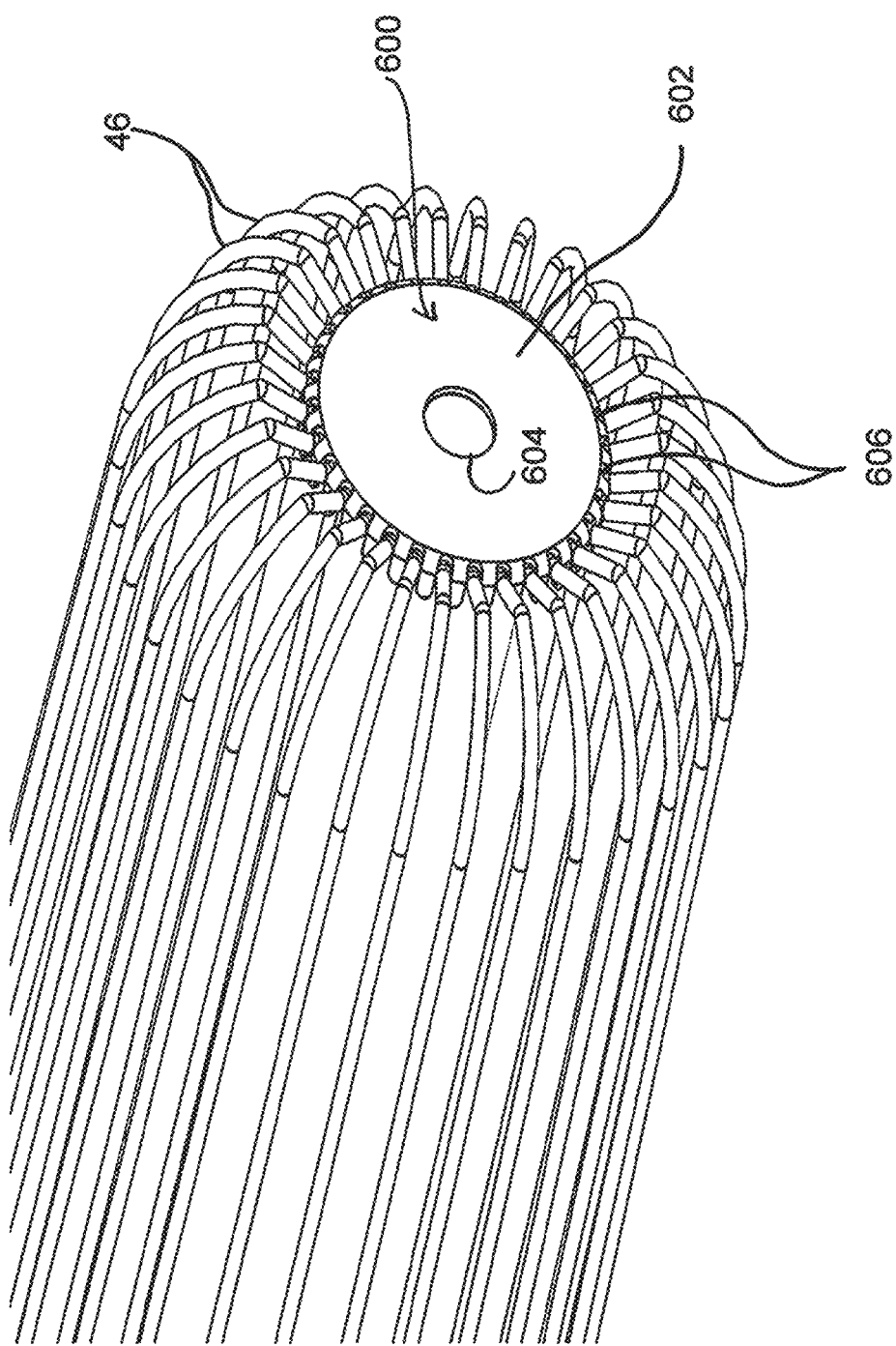
FIG. 19 is a perspective view of an outside face of the end cap of FIG. 17 mounted on a roller assembly.
Figure 20:
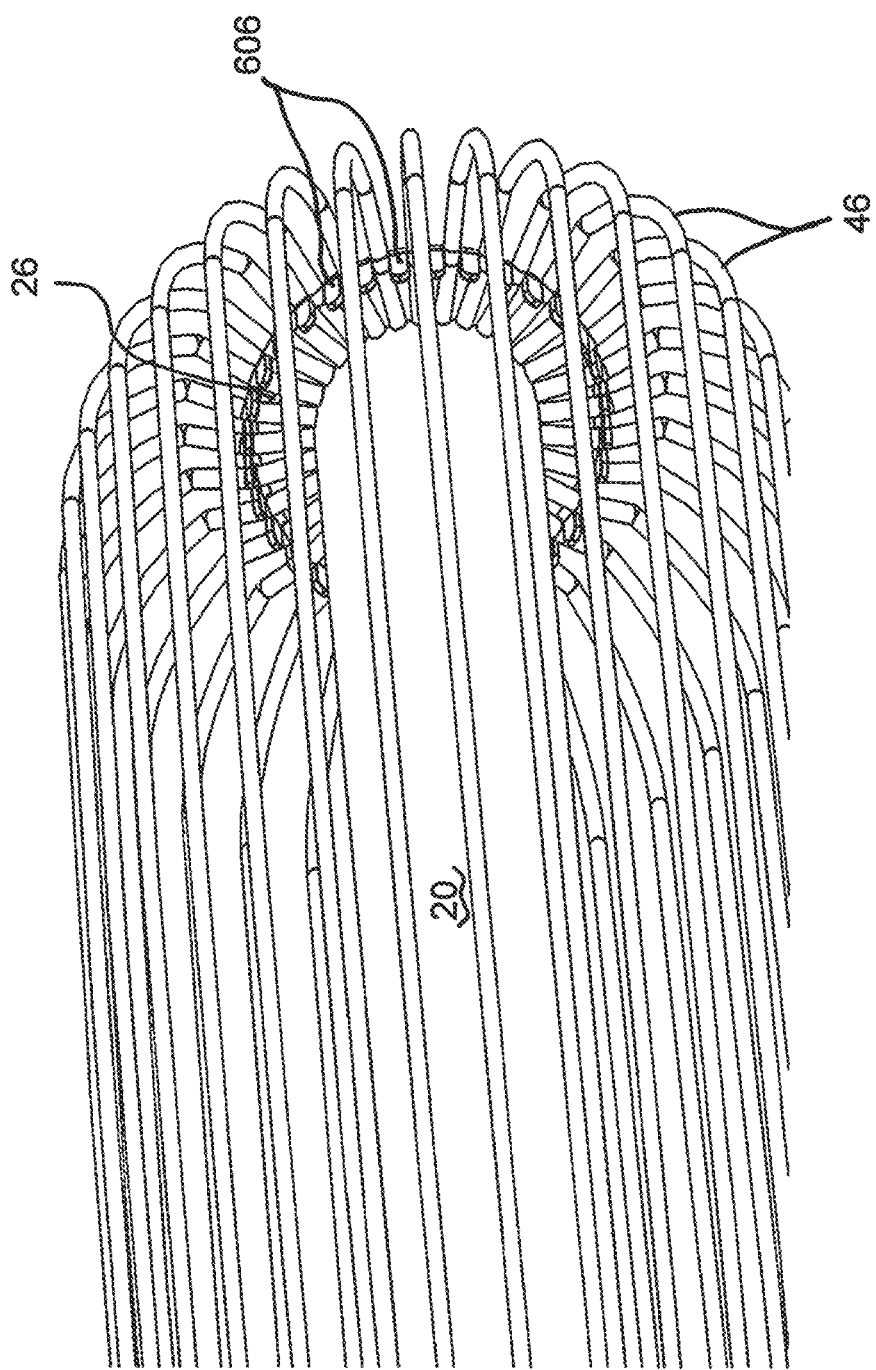
FIG. 20 is a perspective view of an inside face of the end cap of FIG. 17 mounted on a roller assembly.
Figure 21:
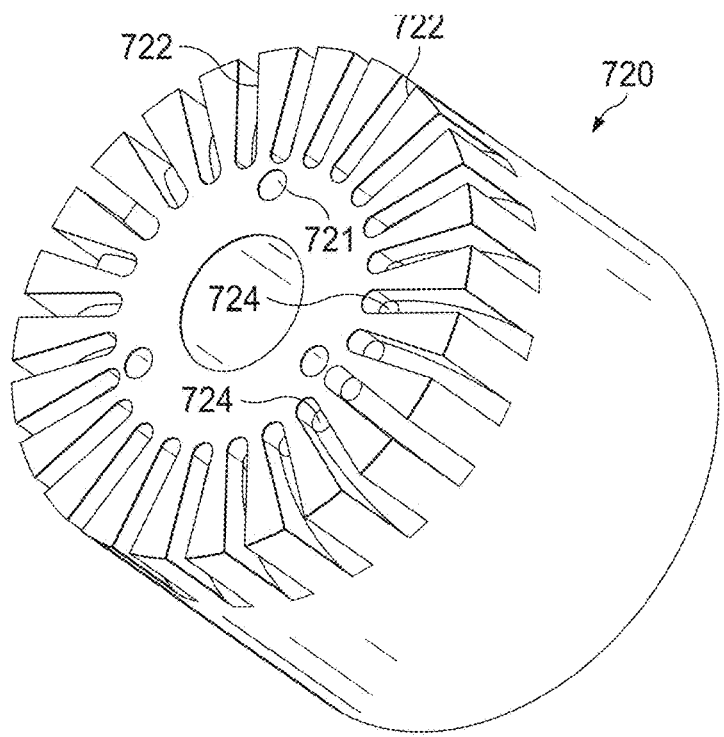
FIG. 21 is a perspective view of another embodiment of a wire holder.
Figure 22:
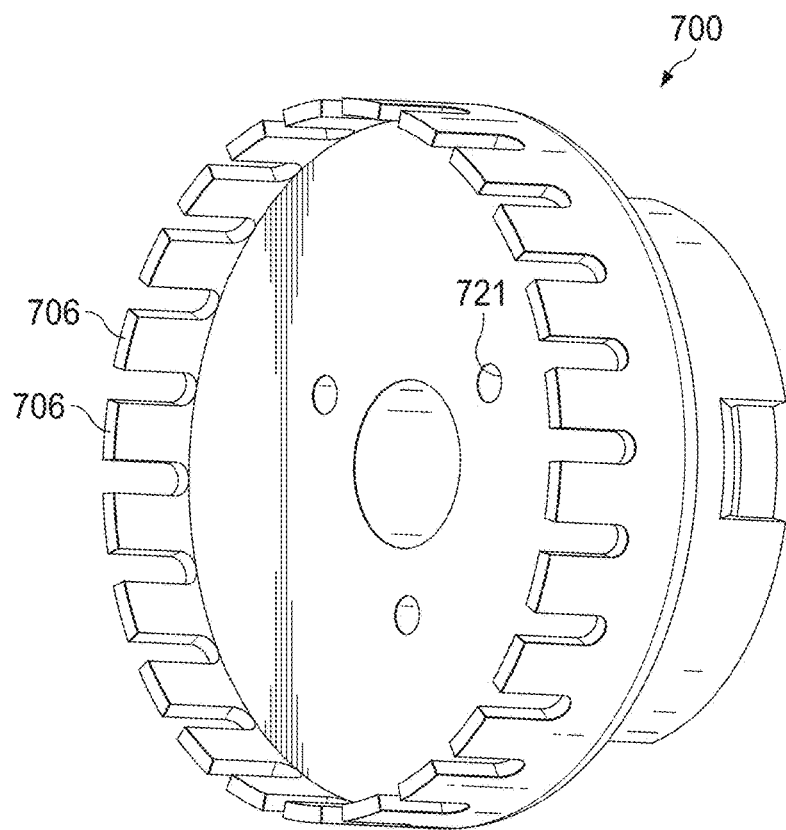
FIG. 22 is a perspective front view of a hub cap for being received on the wire holder of FIG. 21.
Figure 23:
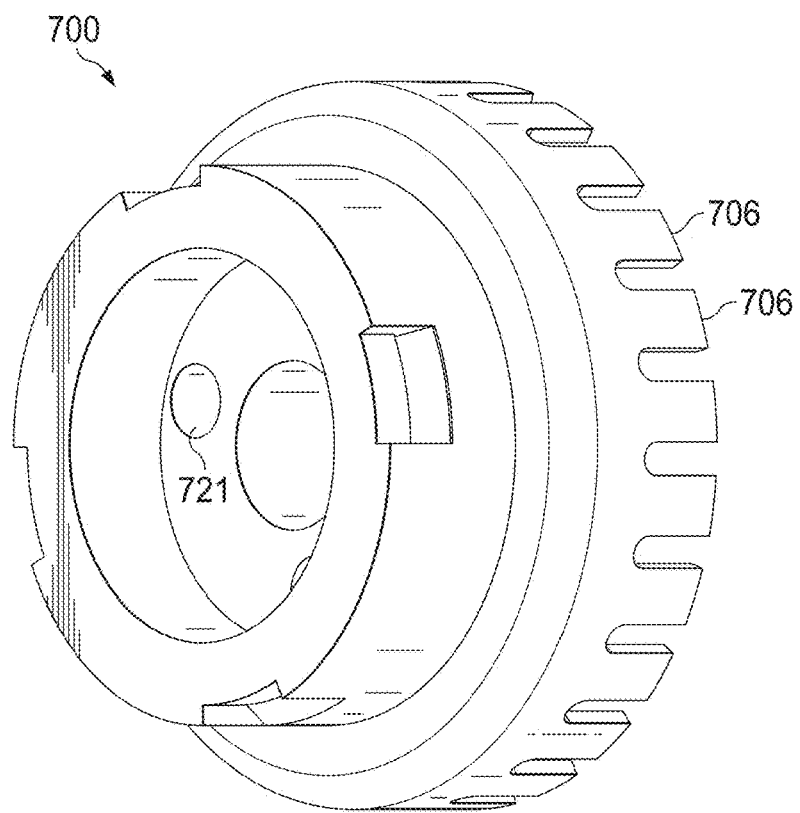
FIG. 23 is a perspective rear view of a hub cap of FIG. 22.
Figure 24:
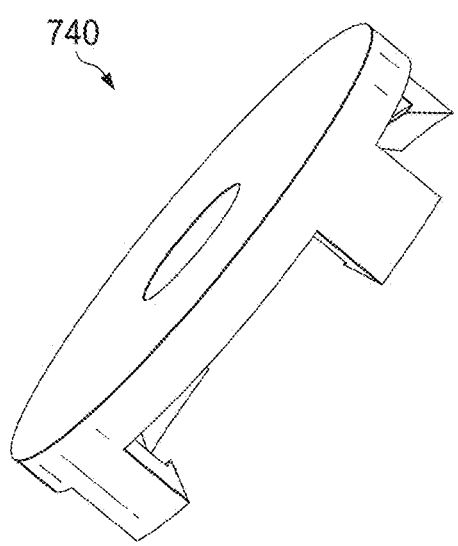
FIG. 24 is a perspective view of a ball bearing cap for being received on said hub cap of FIG. 23.

Alternatively, as seen in FIGS. 18-20, another embodiment of end cap, e.g., end cap 600, is shown. End cap 600 is a disc 602 with a central aperture 604 and a plurality of L-shaped teeth 606 extending outwardly from an outer perimeter of disc 602. The number and width of L-shaped teeth 606 is such that one tooth 606 protrudes into each space at every angular increment of the array of wires and engages against radial portions 44, 344, 444 of its respective sequential pair of wires 20. In this embodiment, radial portions 46, 346, 446 of wires 22, 322, 422 may have a curved portion followed by a straight portion extending into bushing 26, 326, 426.

In another embodiment, the end cap assembly may be molded of a moldable material, such as polycarbonate or another suitable material. Referring now to FIGS. 21-24, shown is a hub cap 700 that defines a plurality of extending teeth 706 extending outwardly from an outer perimeter of hub cap 700. The number and width of exerting teeth 706 protrude into each spare at every angular increment of the array of wires and engages against radial portion 44, 344, 444 of its respective sequential pair of wires 22, 322, 422. Hub cap 700 mates with wire holder 720 and may be secured thereto with a plurality of screws received in screw orifices 721. Wire holder 720 defines a plurality of wire receiving grooves 722 terminating in a wire orifice 724 for receiving an end of a respective wire 22. Wire holder 720 may be received on an end of tube 20. Hub cap 700 may accommodate ball bearing cap 740 for hiding screw orifices 721.

Figure 25:
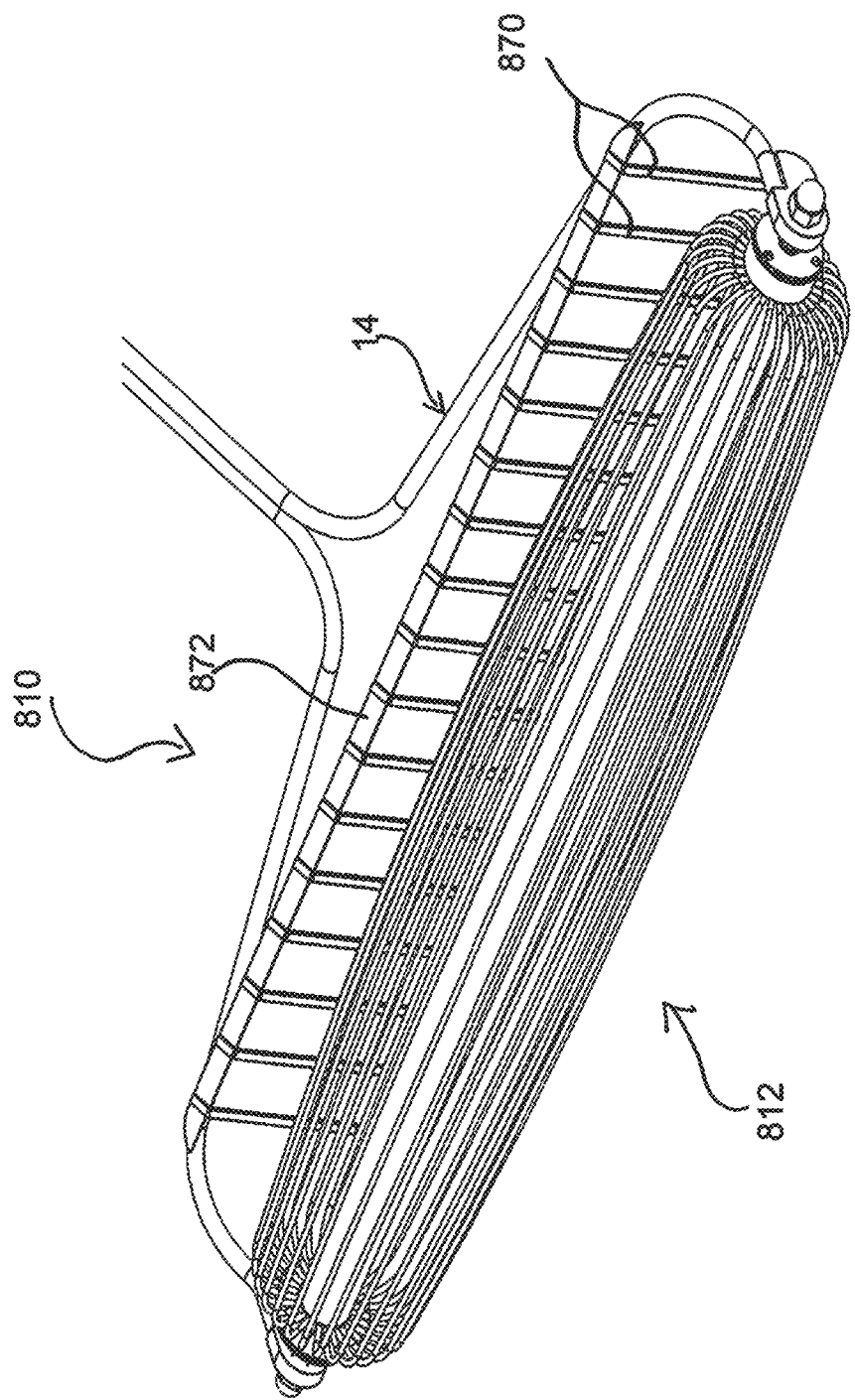
FIG. 25 is a perspective view of two stage single roller embodiment with tines for breaking up packed granular media.

Referring now to FIG. 25, shown is a variation of the embodiment of single roller embodiment 410, i.e., two stage roller assembly 810. Two stage roller assembly 810 includes roller 812 having a similar construction to roller 412 of FIG. 25. Roller 812 is supported between arms of yoke 14. Plowing members, such as tines 870, are affixed to cross-bar 872. The plurality of downwardly extending tines 870 are useful for breaking up granular media that may be coagulated or otherwise bound together. By providing double action roller assembly 810, a user can break up granular media with the plowing members and then smooth the broken up granular media with roller 812 in the manner described above. Although tines 870 are shown as an example plowing member, other configurations of plowing members are possible, including downwardly extending teeth, serrated edges or other means.

The invention has been described above in relation to various embodiments of a manually operated roller assembly. However, it is contemplated that roller assemblies of considerably larger structure can be towed by a vehicle, e.g., for use in smoothing ski slopes, horse race tracks or other example of granular media.

Figure 26:
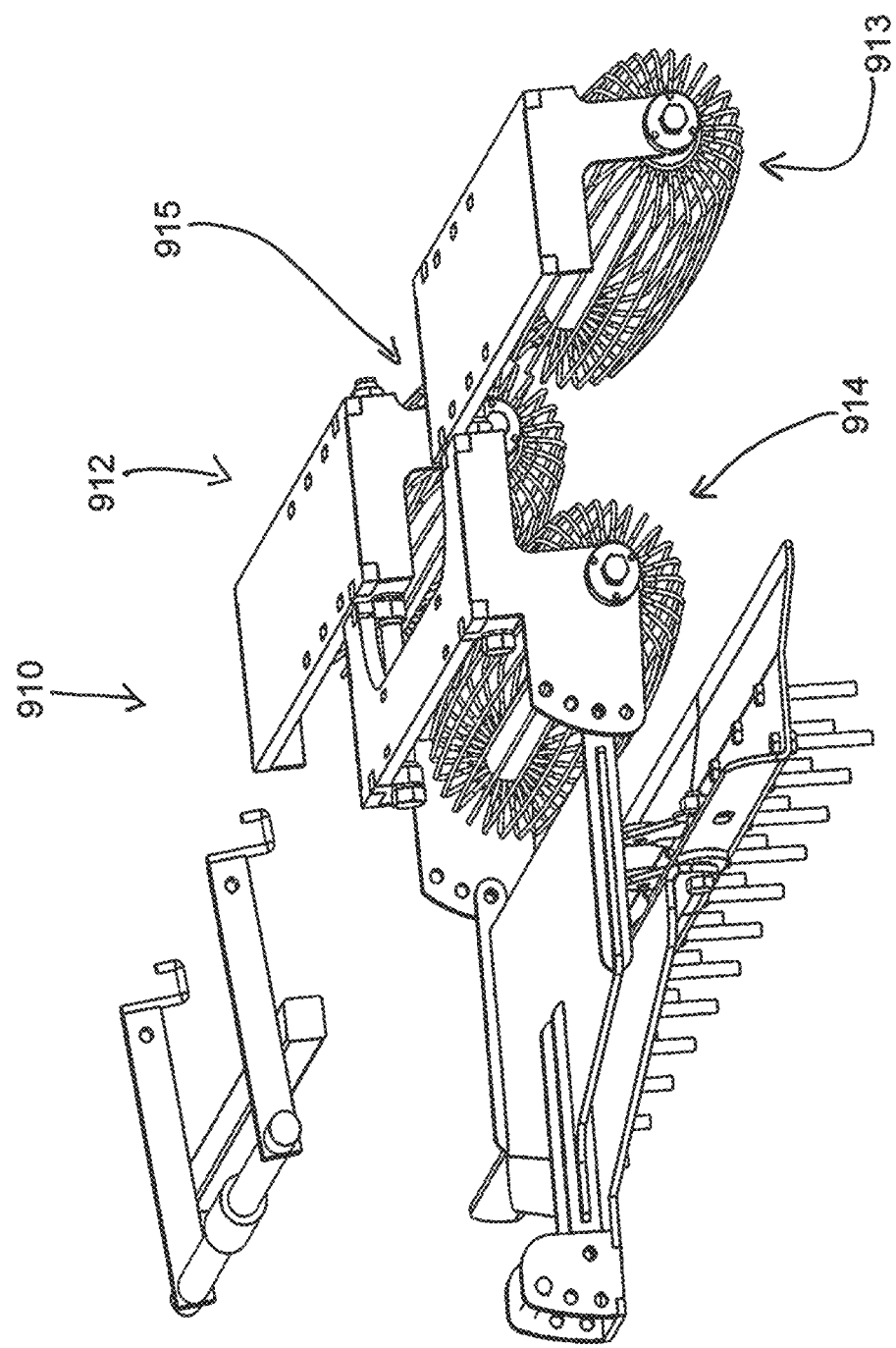
FIG. 26 is a perspective view of a towable embodiment of a two stage multiple roller assembly with tines for breaking up packed granular media.

For example, referring to FIG. 26, shown is a perspective view of towable assembly 910. Towable assembly 910 includes an array of rollers 912 that includes rollers 913, 914, and 915. Rollers 913, 914, and 915 are similar to the rollers described above. However, for large scale uses, e.g., for the ski slope and horse race track applications described above, rollers 913, 914, and 915 could be of a greatly increased diameter that are towed behind a tractor, snowcat machine or other towing apparatus. In one embodiment, towable assembly 910 further includes a plowing member section 960 that provides a platform for supporting plowing members, such as tines 970. Similar to tines 870 described above, the larger towable assembly mounted plowing members are provided to break up granular media before the granular media encounters rollers 913, 914, and 915 for smoothing. Although the example towable assembly 910 is shown with three rollers 913, 914, and 915, it should be understood that any number of rollers may be used including a single roller or six rollers or more.

Although separate embodiment are shown and discussed herein, it should be understood that components of particular embodiments may be combined with other embodiments discussed herein. For example, elements shown and discussed in Applicant's six roller embodiment may be deployed in Applicants four roller or single roller embodiments. Similarly, Applicant's two stage components may be utilized with any combination of hubs, roller types, number of rollers, tubes or no tubes, or other components disclosed herein.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

Thus, it is apparent that there is been provided, in accordance with the invention, a roller assembly for smoothing granular media, such as the sand of a golf course bunker that fully satisfies the objects, aims and advantages set forth above. While the invention has been described in conjunction with specific embodiments thereof, including the interchangeability of components of those embodiments, it is evident that many alternatives, modifications and variations will be apparent to those skilled in the art and in light of the foregoing description. Accordingly, it is intended to embrace all such alternatives, modifications and variations as fall within the spirit of the appended claims.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A roller assembly for smoothing an expanse of granular media, said roller assembly comprising:
   at least one roller having first end, a second end, and a longitudinal axis;
   a plurality of media contacting surfaces that revolve around said longitudinal axis, wherein at least a portion of each of said media contacting surfaces are inwardly movable from a first position to a compressed position, wherein the plurality of media contacting surfaces define a first end, a second end and a mid-point wherein the first end and the second end are closer to the longitudinal axis than the mid-point, wherein said compressed position is closer to said longitudinal axis than said first position, said compressed position resulting from forces due to contact with the granular media;
   wherein when one of said media contacting surfaces is in said compressed position, the media contacting surface returns to said first position with sufficient force and speed to fling at least some of the granular media outwardly from said at least one roller.

2. The roller assembly according to claim 1 wherein:
   said media contacting surfaces are comprised of a plurality of wires having a first end proximate said first end of said roller and a second end proximate said second end of said roller.

3. The roller assembly according to claim 2 further comprising:
   a first bushing proximate said first end of said plurality of wires;
   a second bushing proximate said second end of said plurality of wires.

4. The roller assembly according to claim 3 wherein:
   each of said bushings cooperating with a corresponding ring to clamp said plurality of wires in an annulus therebetween.

5. The roller assembly according to claim 3 further comprising:
   a shaft extending along said longitudinal axis, said bushings being rotatable about said longitudinal axis.

6. The roller assembly according to claim 5 further comprising:

a yoke;
said shaft extending between arms of said yoke; and
an elongated handle extending from said yoke in a direction transverse to said shaft.

7. The roller assembly according to claim 2 wherein:
each wire of said plurality of wires is disposed in a corresponding radial plane emanating from said longitudinal axis.

8. The roller assembly according to claim 7 wherein:
said corresponding radial planes of said plurality of wires being spaced at equal angular increments about said longitudinal axis.

9. The roller assembly according to claim 2 wherein:
each wire of said plurality of wires has a first radial segment affixed to a first bushing, a second radial segment affixed to a second bushing, and a longitudinal portion between said first radial segment and said second radial segment;
wherein said first radial segment is disposed in a first radial plane emanating from said longitudinal axis and said second radial segment is disposed in a second radial plane emanating from said longitudinal axis.

10. The roller assembly according to claim 9 wherein:
said first radial segment and said second radial segment of said wire of said plurality of wires spaced at equal angular increments about said longitudinal axis.

11. The roller assembly according to claim 2 wherein:
each wire of said plurality of wires being resiliently flexible to distort inwardly in response to increasing force of contact with, and to recover during release of force of contact from, the granular media as said roller rotates about said longitudinal axis on the expanse of granular media.

12. The roller assembly according to claim 1, wherein:
said plurality of media contacting surfaces defines a first end, a second end and a mid-point wherein said first end and said second end are closer to said longitudinal axis than said mid point for forming convex media contacting surfaces.

13. The roller assembly according to claim 1 wherein:
said roller is mounted on a towable assembly.

14. A roller assembly for smoothing an expanse of granular media, said roller assembly comprising:
at least one roller having first end, a second end, and a longitudinal axis;
a plurality of media contacting surfaces that revolve around said longitudinal axis, wherein at least a portion of each of said media contacting surfaces are inwardly movable from a first position to a compressed position, wherein said compressed position is closer to said longitudinal axis than said first position, said compressed position resulting from forces due to contact with the granular media;
wherein when one of said media contacting surfaces is in said compressed position, the media contacting surface returns to said first position with sufficient force and speed to fling at least some of the granular media outwardly from said at least one roller;
a plurality of plowing members adjacent to said roller;
wherein said plowing members are provided for breaking up said granular media and said roller is provided for smoothing said broken up granular media.

15. The roller assembly according to claim 14 wherein:
said plowing members are mounted on a towable assembly.

16. A roller assembly for smoothing an expanse of granular media, said roller assembly comprising:
at least one roller having first end, a second end, and a longitudinal axis, said roller having a plurality of media contacting surfaces that revolve around said longitudinal axis;
a plurality of plowing members adjacent to said at least one roller, said plowing members for breaking up the granular media;
said roller for smoothing said broken up granular media;
said plurality of media contacting surfaces for flinging at least some of the granular media outwardly from said roller;
wherein at least a portion of said plurality of media contacting surfaces are inwardly movable from a first position to a compressed position, wherein said compressed position is closer to said longitudinal axis than said first position, said compressed position resulting from forces due to contact with the granular media;
wherein when one of said plurality of media contacting surfaces is in said compressed position, said media contacting surface returns to said first position with sufficient force and speed to fling at least some of the granular media outwardly of said roller.

17. The roller assembly according to claim 16 wherein:
said plowing members are a plurality of tines.

18. The roller assembly according to claim 16 wherein said roller wherein:
said plurality of media contacting surfaces define a first end, a second end and a mid-point wherein said first end and said second end are closer to said longitudinal axis than said mid point for forming a convex media contacting surface.

19. The roller assembly according to claim 16 wherein:
said roller is mounted on a towable assembly.

20. The roller assembly according to claim 16 wherein:
said plowing members are mounted on a towable assembly.

21. A roller assembly for smoothing an expanse of granular media, said roller assembly comprising:
at least one roller having first end, a second end, and a longitudinal axis, said roller having a plurality of media contacting surfaces that revolve around said longitudinal axis;
a plurality of plowing members adjacent to said at least one roller, said plowing members for breaking up the granular media;
said roller for smoothing said broken up granular media;
said plurality of media contacting surfaces for flinging at least some of the granular media outwardly from said roller;
said plurality of media contacting surfaces is comprised of a plurality of wires having a first end proximate said first end of said roller and having a second end proximate said second end of said roller.

22. The roller assembly according to claim 21 further comprising:
a first bushing proximate said first end of said plurality of wires;
a second bushing proximate said second end of said plurality of wires;
a shaft extending along said longitudinal axis, said bushings being rotatable about said longitudinal axis.

23. The roller assembly according to claim 22 further comprising:
a yoke defining a first arm and a second arm;
said shaft extending between arms of said yoke; and
an elongated handle extending from said yoke.

24. The roller assembly according to claim 21 wherein:
each wire of said plurality of wires is disposed in a corresponding radial plane emanating from said longitudinal axis.

25. The roller assembly according to claim 21 wherein:
a first bushing proximate said first end of said plurality of wires;
a second bushing proximate said second end of said plurality of wires;
each wire of said plurality of wires has a first radial segment affixed to said first bushing, a second radial segment affixed to said second bushing, and a longitudinal portion between said first radial segment and said second radial segment;
wherein said first radial segment is disposed in a first radial plan emanating from said longitudinal axis and said second radial plan is disposed in a second radial plan emanating from said longitudinal axis.

26. The roller assembly according to claim 21 wherein:
each wire of said plurality of wires being resiliently flexible to distort inwardly in response to increasing force of contact with, and to recover during release of force of contact from, the granular media as said roller rotates about said longitudinal axis on the expanse of granular media.

27. The roller assembly according to claim 26 wherein:
said roller is mounted on a towable assembly.

28. A roller assembly for smoothing an expanse of granular media, said roller assembly comprising:
at least one roller having first end, a second end, and a longitudinal axis, said roller having a plurality of media contacting surfaces that revolve around said longitudinal axis, said media contacting surfaces defining a first end, a second end and a mid-point wherein said first end and said second end are closer to said longitudinal axis than said mid-point for forming a convex media contacting surface;
said plurality of media contacting surfaces for flinging at least some of the granular media outwardly from said roller.

29. The roller assembly according to claim 28 wherein:
convexities of said media contacting surfaces proximate said first end and said second end of said media contacting surfaces are more arcuate than a convexity proximate said mid-point of said convex media contacting surface.

30. The roller assembly according to claim 28 wherein:
at least a portion of said contacting surfaces are inwardly movable from a first position to a compressed position, wherein said compressed position is closer to said longitudinal axis than said first position, said compressed position resulting from forces due to contact with the granular media;
wherein when one of said plurality of media contacting surfaces is in said compressed position, the media contacting surface returns to said first position with sufficient force and speed to fling at least some of the granular media outwardly from said roller.

31. The roller assembly according to claim 28 further comprising:
a plurality of plowing members adjacent to said roller;
wherein said plowing members are provided for breaking up the granular media and said roller is provided for smoothing said broken up granular media.

32. The roller assembly according to claim 31 wherein:
said plowing members are mounted on a towable assembly.

33. The roller assembly according to claim 28 wherein:
said media contacting surfaces are comprised of a plurality of wires having a first end proximate said first end of said roller and a second end proximate a second end of said roller.

34. The roller assembly according to claim 33 further comprising:
a first bushing proximate said first end of said plurality of wires;
a second bushing proximate said second end of said plurality of wires;
a shaft extending along said longitudinal axis, said bushings being rotatable about said longitudinal axis.

35. The roller assembly according to claim 34 further comprising:
a yoke defining a first arm and a second arm;
said shaft extending between arms of said yoke; and
an elongated handle extending from said yoke.

36. The roller assembly according to claim 33 wherein:
each wire of said plurality of wires is disposed in a corresponding radial plane emanating from said longitudinal axis.

37. The roller assembly according to claim 33 further comprising:
a first bushing proximate said first end of said plurality of wires;
a second bushing proximate said second end of said plurality of wires;
each wire of said plurality of wires has a first radial segment affixed to said first bushing, a second radial segment affixed to a second bushing, and a longitudinal portion between said first radial segment and said second radial segment;
wherein said first radial segment is disposed in a first radial plane emanating from said longitudinal axis and said second radial segment is disposed in a second radial plane emanating from said longitudinal axis.

38. The roller assembly according to claim 33 wherein:
each wire of said plurality of wires being resiliently flexible to distort inwardly in response to increasing force of contact with, and to recover during release of force of contact from, the granular media as said roller rotates about said longitudinal axis on the expanse of granular media.

\* \* \* \* \*